United States Patent [19]
Maeda et al.

[11] Patent Number: 5,887,062
[45] Date of Patent: Mar. 23, 1999

[54] TWO-WAY DATA COMMUNICATION METHOD AND TWO-WAY DATA COMMUNICATION APPARATUS USING THE SAME

[75] Inventors: Takio Maeda, Shijonawate; Hideki Inoue; Shizuo Ishitani, both of Takatsuki; Hidemi Henmi, Otsu, all of Japan

[73] Assignee: Matsushita Electric Industrial Co., Ltd., Osaka, Japan

[21] Appl. No.: 754,509

[22] Filed: Nov. 19, 1996

[30] Foreign Application Priority Data

Nov. 24, 1995 [JP] Japan .................................. 7-306164
Nov. 27, 1995 [JP] Japan .................................. 7-307728
Dec. 12, 1995 [JP] Japan .................................. 7-323352

[51] Int. Cl.$^6$ ........................... H04N 7/167; H04N 7/14; H04N 7/00
[52] U.S. Cl. ...................... 380/20; 340/825.34; 348/13; 348/12; 348/1; 455/5.1
[58] Field of Search .............................. 380/20, 825.34; 340/825.34; 348/13, 12, 1; 455/5.1

[56] References Cited

U.S. PATENT DOCUMENTS

| | | | |
|---|---|---|---|
| 4,710,955 | 12/1987 | Kauffman ................................. | 380/10 |
| 4,829,558 | 5/1989 | Welsh . | |
| 5,109,286 | 4/1992 | West, Jr. et al. ......................... | 380/52 |
| 5,459,304 | 10/1995 | Eisenmann .............................. | 235/380 |
| 5,585,858 | 12/1996 | Harper et al. . | |
| 5,592,212 | 1/1997 | Handelman .............................. | 348/12 |
| 5,727,065 | 3/1998 | Dillon ...................................... | 380/49 |
| 5,734,720 | 3/1998 | Salganicoff .............................. | 380/20 |

FOREIGN PATENT DOCUMENTS

| | | |
|---|---|---|
| 0 447 038 | 9/1991 | European Pat. Off. . |
| 2 289 600 | 11/1995 | United Kingdom . |
| WO 87/05764 | 9/1987 | WIPO . |
| WO 88/06826 | 9/1988 | WIPO . |
| WO 89/09528 | 10/1989 | WIPO . |
| WO 94/28486 | 12/1994 | WIPO . |

OTHER PUBLICATIONS

Szurkowski et al., "Interactive multimedia services for consumers and businesses", AT&T Technical Journal, vol. 74, No. 5, Sep. 1995–Oct. 1995, pp. 117–129.

Deloddere et al., "Interactive video on demand", IEEE Communications Magazine, vol. 32, No. 5, May 1, 1994, pp. 82–88.

European Search Report for Int'l Appln No. 96118345.6 dated Dec. 23, 1997.

*Primary Examiner*—Stephen C. Buczinski
*Attorney, Agent, or Firm*—Ratner & Prestia

[57] ABSTRACT

The invention relates to a two-way data communication apparatus in television broadcast or data broadcast signal transmitted through telephone circuit, and a two-way data communication apparatus according to this method, and more particularly, in a system having a response server and an individual information server connected to a telephone circuit, the apparatus comprises data broadcast decoder means for decoding television broadcast or data broadcast signal transmitted through telephone circuit, display means for displaying the information of television broadcast or data broadcast, and a modem connected to the telephone circuit, and moreover by installing user information control means for controlling the individual information server, the individual information can be controlled exclusively, and by registering, updating, collating and confirming it securely, efficient keeping of user information and confidence are achieved, and problems in two-way communication are prevented.

63 Claims, 24 Drawing Sheets

FIG. 4

D12 ··· Order confirm data 1: Terminal ID, user ID

| Data attribute information | Terminal ID | User ID |
|---|---|---|

D13 ··· Terminal ID data: Terminal ID, user ID

| Data attribute information | Service firm code | Terminal ID | User ID |
|---|---|---|---|

14 ··· Ciphered user information: Name, telephone number, address (ciphered)

| Data attribute information | Service firm code | Terminal ID | User ID | Name, etc. (ciphered) |
|---|---|---|---|---|

D16 ··· Order confirm data 2: Terminal ID, user ID, password, ordered commodity information

| Data attribute information | Terminal ID | User ID | password (ciphered) | Ordered commodity information (ciphered) |
|---|---|---|---|---|

D17 ··· Terminal ID, merchandise data: Terminal ID, user ID, password, ordered commodity information

| Data attribute information | Service firm code | Terminal ID | User ID | Password (ciphered) | Ordered commodity information (ciphered) |
|---|---|---|---|---|---|

D18 ··· User information: Name, telephone number, address

| Data attribute information | Service firm code | Name, etc. | Ordered commodity information |
|---|---|---|---|

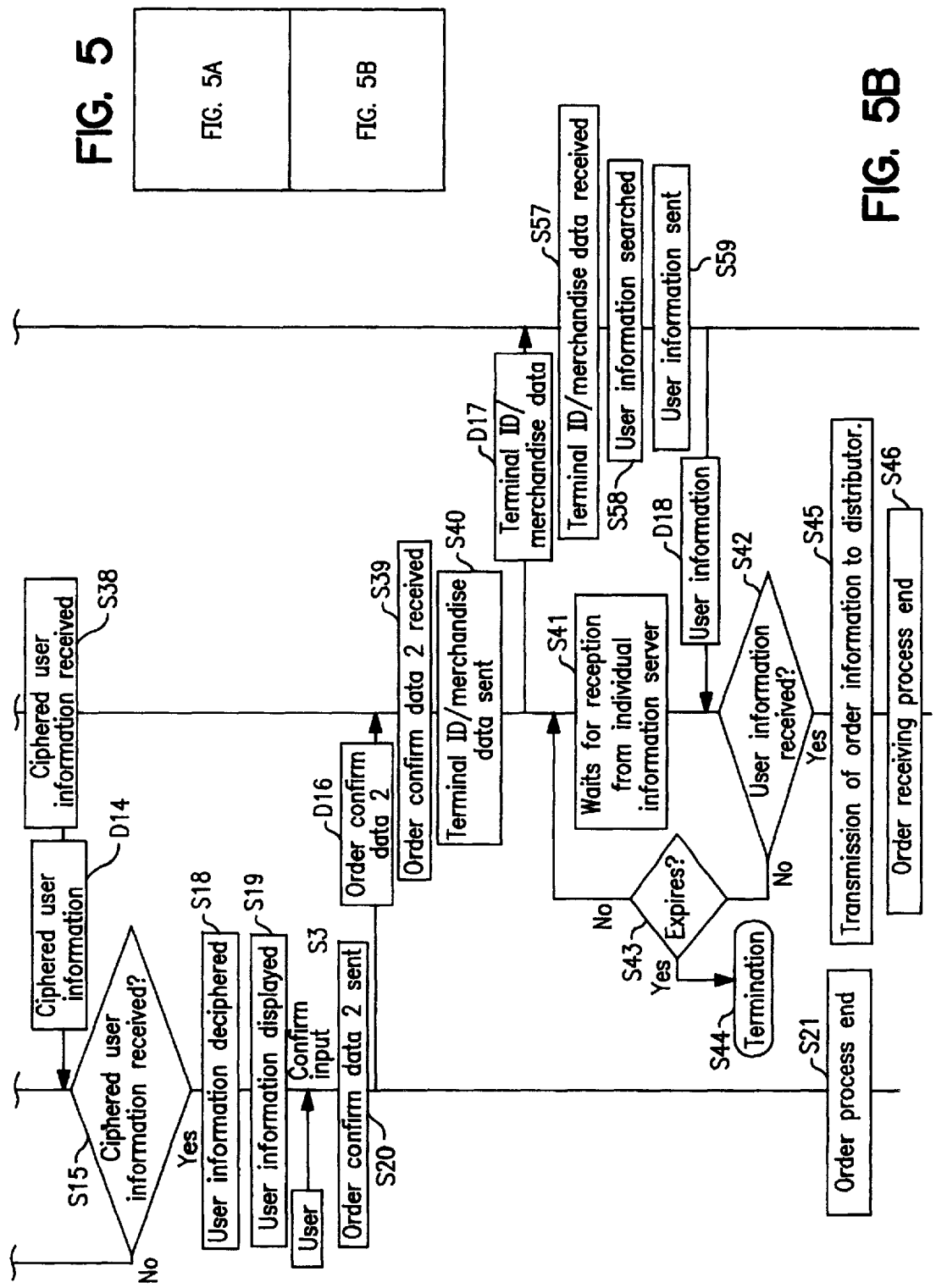

TWO-WAY DATA COMMUNICATION METHOD AND TWO-WAY DATA COMMUNICATION APPARATUS USING THE SAME

BACKGROUND OF THE INVENTION

The present invention relates to a two-way data communication method in data broadcast signals transmitted by television broadcast or telephone circuit, and a two-way data communication apparatus by the same method, and the apparatus relates to a two-way communication apparatus comprising a data broadcast decoder for decoding the data broadcast signals transmitted by television broadcast or telephone circuit, a display unit for displaying the video signals of television broadcast or data broadcast, and a modem connected to the telephone circuit.

In particular, it relates to a two-way communication method applied in a system in which a response server and an individual information server are connected to the telephone circuit, and a two-way communication apparatus using the same method.

FIG. 1 is a block diagram showing an outline configuration of a data broadcast system with an interactive function. In FIG. 1, reference numeral 1 is a television broadcast station, 2 is a data broadcast receiver serving also as television receiver comprising a data broadcast decoder 2a and a modem 2b, and 3 is a response server connected to the data broadcast receiver 2 through a telephone circuit 4 and also connected to the television broadcast station 1 through a telephone circuit 5.

At the television broadcast station 1, character and graphic data, and program for giving interactive property are coded according to predetermined standard, and converted into data signals, and synchronizing codes and error correction codes are added, and are assigned in a data packet to be prepared as data broadcast signal, which is superposed in the vertical blanking period (VBL) of video signal same as in the case of teletext, and is converted into radio wave and broadcast.

In the data broadcast receiver 2, the data broadcast signal is decoded in the data broadcast decoder 2a, and stored and displayed, and is further deciphered as required and processed as specified. If the content of television broadcast is television shopping or opinion survey, the data broadcast signal includes the telephone number and facsimile number of the customer and distributor, which are stored in the memory.

By input means of the data broadcast receiver 2, the merchandise name, quantity of purchase, purchaser's name, address, response data of opinion survey, and others are added, and stored in memory. By dialing automatically, necessary data is transmitted to the response server 3 by the modem 2b through the telephone circuit 4.

The response server 3 collects orders and replies from the individual homes, and processes data according to the prepared instructions from the television broadcast station 1, information provider, or service outlet, and transmits the result of processing to the television broadcast station 1, information provider, or service outlet. In this way, data is transmitted and received interactively (in two ways).

When the user receives presentation of online service between the data broadcast receiver 2 and the response server 3 of information provider or service outlet, for example, in the case of online shopping, the individual information of the user such as name, address and telephone number is indispensable for actually distributing the merchandise to the user or collecting the payment.

If the individual information is held and controlled in the response server, as the response servers in service increase or new response servers are available, the individual information must be registered in the new response servers. It is very troublesome to register every individual information. Still worse, as the response servers holding and controlling the individual information increase, possibility of unexpected leak of individual information to outside increases, and a problem of protection of privacy arises.

To eliminate such inconveniences, separately from the response servers of the information provider and service outlet, it may be considered to establish an organ such as individual information server for holding and controlling individual information exclusively. An individual response server, only when the merchandise order is established, inquires and acquires the individual information of the transaction partner from the individual information server. By holding and controlling the individual information of mass users exclusively in the independent individual information server, it solves the problems of the trouble of individual registrations, and external leak of huge individual information.

When data broadcast signals are superposed on television broadcast, various information can be presented inexpensively over a wide area (coverage). Thus, various information providers can transmit smart information.

However, since the individual users present the individual information to the information providers and service outlets, if huge individual information leaks, it can arouse the problem of protection of privacy. It is hence necessary to protect the information of individual users.

In particular, if the individual information is held and controlled in the response server, every time the response servers increase in number, the individual information must be registered. It is very troublesome, and also possibility of unexpected leak of individual information to outside increases, and a problem of protection of privacy arises.

To receive presentation of various online services such as online shopping transacted through telephone circuit between the data broadcast receiver and response server as mentioned above, registration of user individual information such as name, address and telephone number is indispensable.

Such individual information is, however, subject to change. When moving the residence, the address and telephone number are change. If the residence is not changed, the telephone number can be changed. The name may be changed by marriage or the like. Although the individual information is changed, if the individual information registered in the individual information server is unchanged, the user cannot receive presentation of online service, and the information provider or service outlet cannot do business. According to the rule of the beneficiary's burden, the user must request the individual information server to renew (update) the registration of individual information when the own individual information is changed.

Actually, however, the user often notices the necessity of updating only when making use of presentation of online service. Since it is not updated yet, actually, the user cannot receive presentation of online service when desired. It is far from organic function of the two-way data communication system.

To function the two-way data communication system organically, therefore, it is considered to urge periodically the user to update if the individual information is changed.

SUMMARY OF THE INVENTION

It is hence an object of the invention to solve the above problems by efficiently and securely controlling the user information recorded in such individual information server.

To solve the problems, the invention provides a two-way data communication method comprising a step of decoding television broadcast or data broadcast signal transmitted through telephone circuit, a step of displaying decoded information of television broadcast or data broadcast, and step of presenting user information to an individual information server through telephone circuit by a user, and a step of controlling information about registration, updating and confirmation of the user information in the individual information server.

The apparatus employing this method comprises data broadcast decoder means for decoding television broadcast or data broadcast signal transmitted through telephone circuit, display means for displaying the information of television broadcast or data broadcast decoded by the data broadcast decoder means, a modem connected to the telephone circuit, and user information control means for controlling the user information to be recorded in an individual information server, thereby presenting a two-way data communication apparatus for presenting the user information to the individual information server through the telephone circuit by the user, and controlling the information about registration, updating and confirmation of the user information in the individual information server by the user information control means.

Accordingly, the user information can be protected, updated, and registered securely, while inconveniences of two-way communication can be prevented.

In particular, by establishing an organ such as individual information server for holding and controlling the individual information exclusively, it is not necessary to register the individual information in each response server, and in addition to this effect, by installing the user information control means for registering, updating and collating the individual information in the individual information server in the two-way data communication apparatus itself, the individual information can be registered, updated, and collated easily, and the protection will be securer.

Moreover, a two-way data communication method is presented, in which the step of controlling the user information comprises a step of sending ciphered first information to the response server through a telephone circuit by the user, a step of receiving a ciphered confirm response from the individual information server through the response server, a step of receiving key information for deciphering the confirm response, a step of confirming transmission of the first information by the key information, a step of sending ciphered second information to compensate for the first information to the individual information server through the response server, and a step of sending the user information to the response server according to the second information by the individual information server, and supplying this information to a third party by the response server.

In the apparatus employing this method, the user information control means comprises means for sending ciphered first information to a response server by the user through a telephone circuit, means for receiving ciphered confirm response from an individual information server through the response server, means for receiving key information for deciphering this confirm response, means for confirming transmission of the first information by this key information, and means for sending ciphered second information to compensate for the first information to the individual information server through the response server, in which the individual information server sends the user information to the response server on the basis of the second information, and this information is supplied to a third party by the response server, so that the data protection may be reinforced. That is, the user confirms that the order has been received, and at this time of ordering, the information provider or service outlet cannot hold the individual information, and can use the individual information of the user only once as the response to the order, so that the user information can be securely protected.

According to the two-way data communication method, the step of controlling the user information comprises a step of collating connection of telephone circuit on the basis of the user information from the individual information server in a specific period after the telephone circuit is once cut off, and a step of displaying completion of procedure when collated, or displaying incompletion of procedure when not collated. In the apparatus employing this method, which is applied in the system for protecting the user information by registering the user easily in an individual information server for controlling the individual information independent of the information provider or service outlet, the user information control means comprises means for collating connection of telephone circuit on the basis of the user information from the individual information server in a specific time after the telephone circuit is once cut off, and means for displaying completion of procedure when collated, or displaying incompletion of procedure when not collated, so that the data can be updated securely.

In the two-way data communication method, the step of controlling the user information comprises a step of comparing the data of the date of the registered user information and the present date, and a step of displaying a specific subsequent period when matched, or a message for urging updating if necessary to change the user individual information. The apparatus employing this method comprises means for comparing the data of the date of the registered user information and the present date, and means for displaying a specific subsequent period when matched, or a message for urging updating if necessary to change the user individual information, and therefore the data can be updated more efficiently and securely. That is, if the user individual information such as name, address and telephone number is changed, a message for urging updating is displayed, and the registration is renewed, and the two-way data communication system can function organically.

BRIEF DESCRIPTION OF THE DRAWINGS

FIG. 4 is a diagram showing data content of embodiment 1.

(a) Remote control operation screen (b) Selection screen

Figure 11:
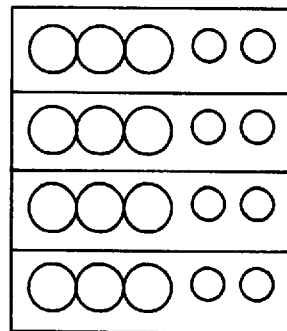

FIG. 11 is a diagram showing a regional database in embodiment 3.

Figure 12:
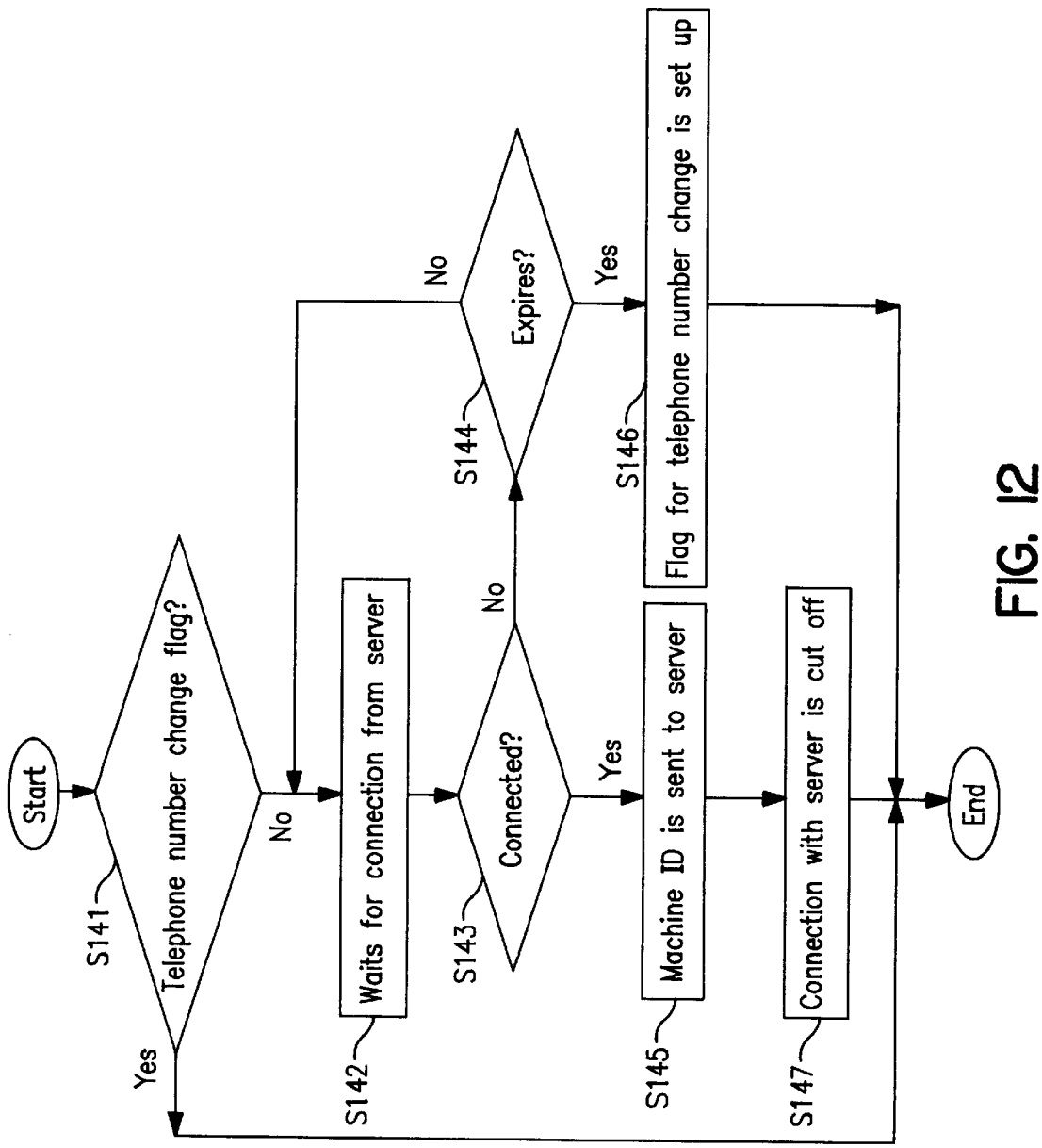

FIG. 12 is a flowchart for explaining the operation of embodiment 4.

Figure 13:
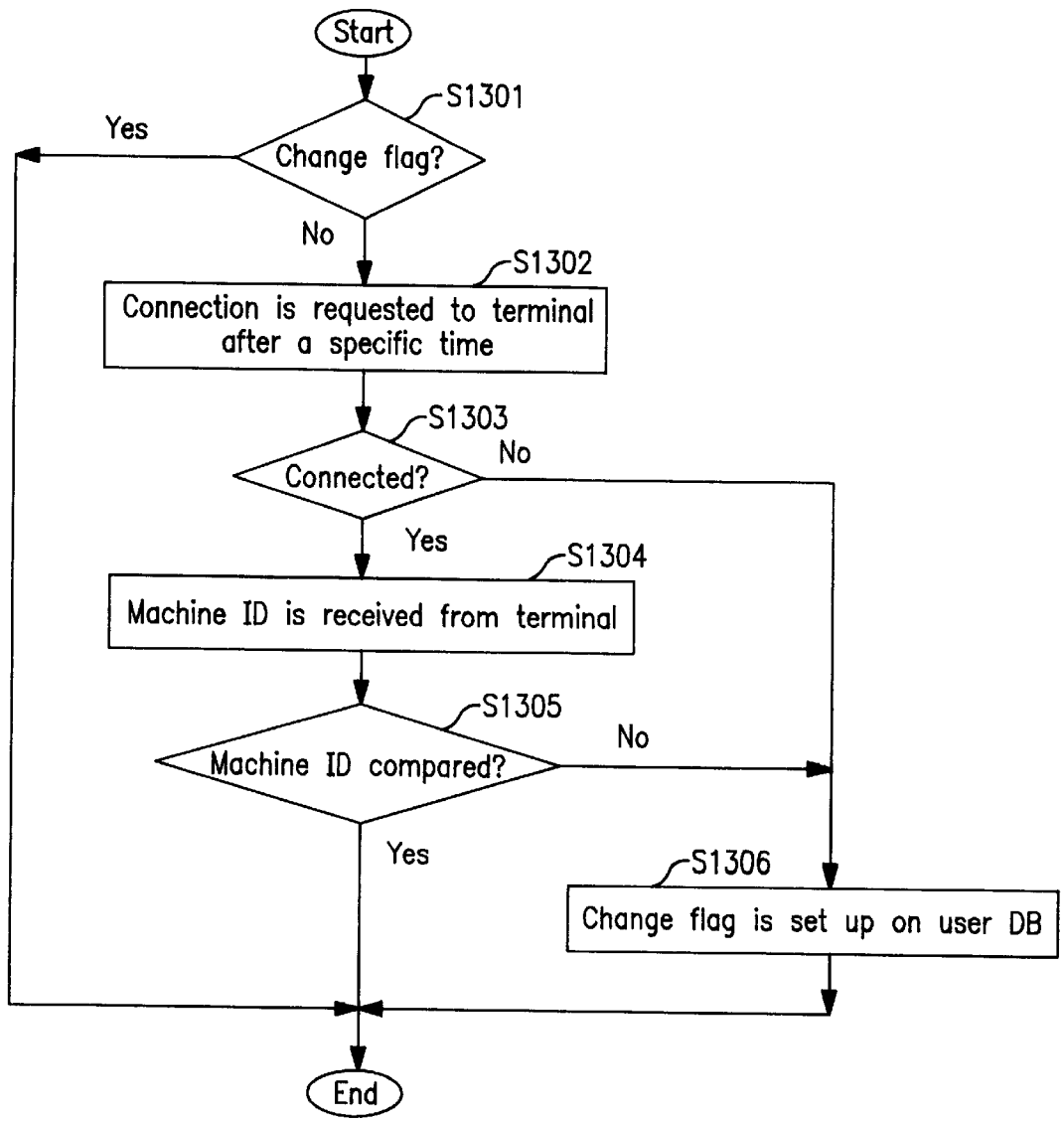

FIG. 13 is a flowchart for explaining the operation of embodiment 4.

Figure 14:
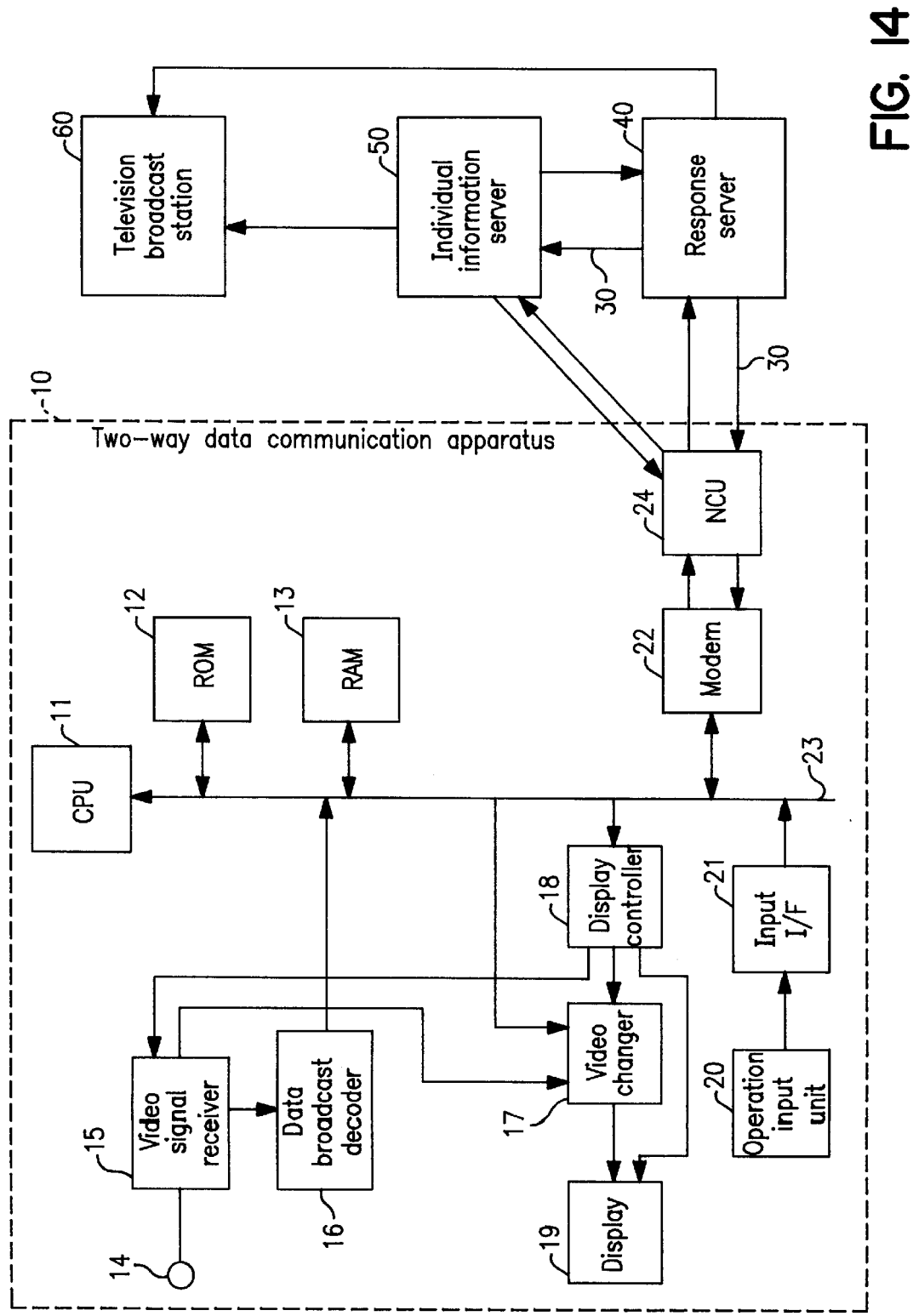

FIG. 14 is a block diagram showing an electric constitution of a two-way data communication apparatus according to embodiment 5 of the invention.

Figure 15:
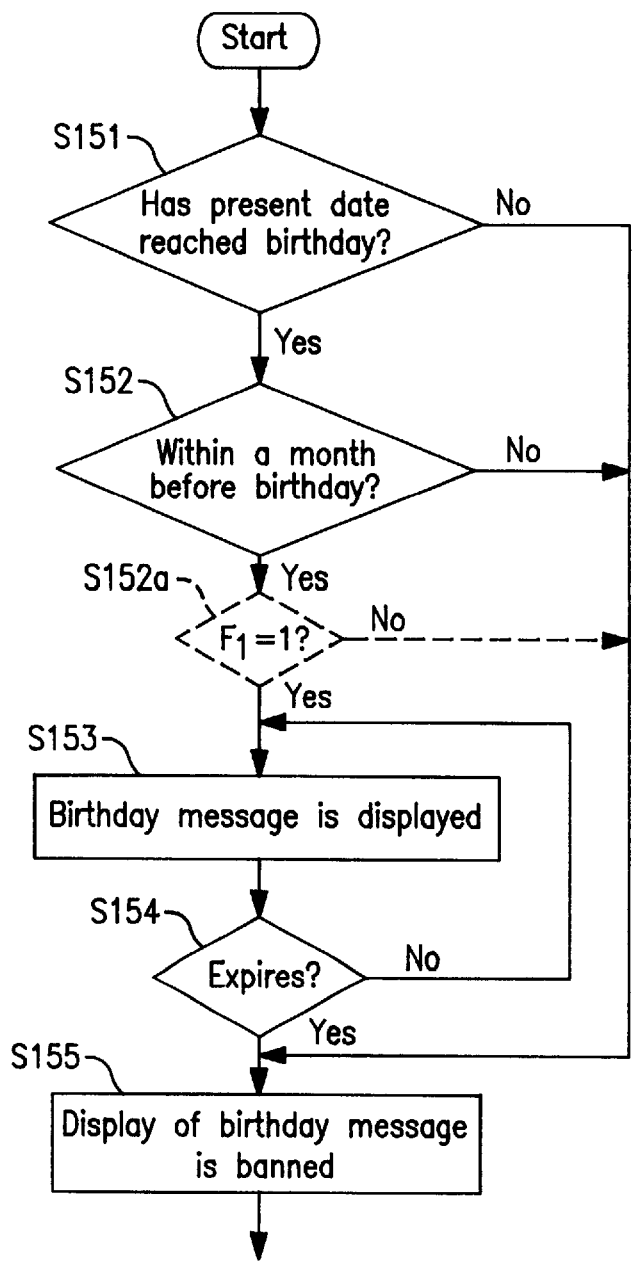

FIG. 15 is a flowchart for explaining the operation of display of birthday message in embodiment 5.

Figure 16A:
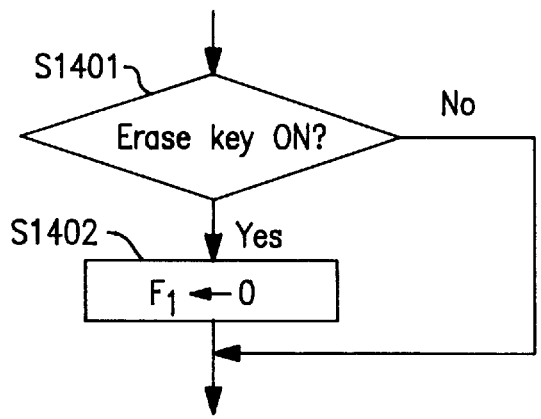

FIGS. 16 are a flowchart for explaining the operation of avoiding frequent display of birthday message.

(a) Reset of display flag (b) Set of display flag

Figure 17:
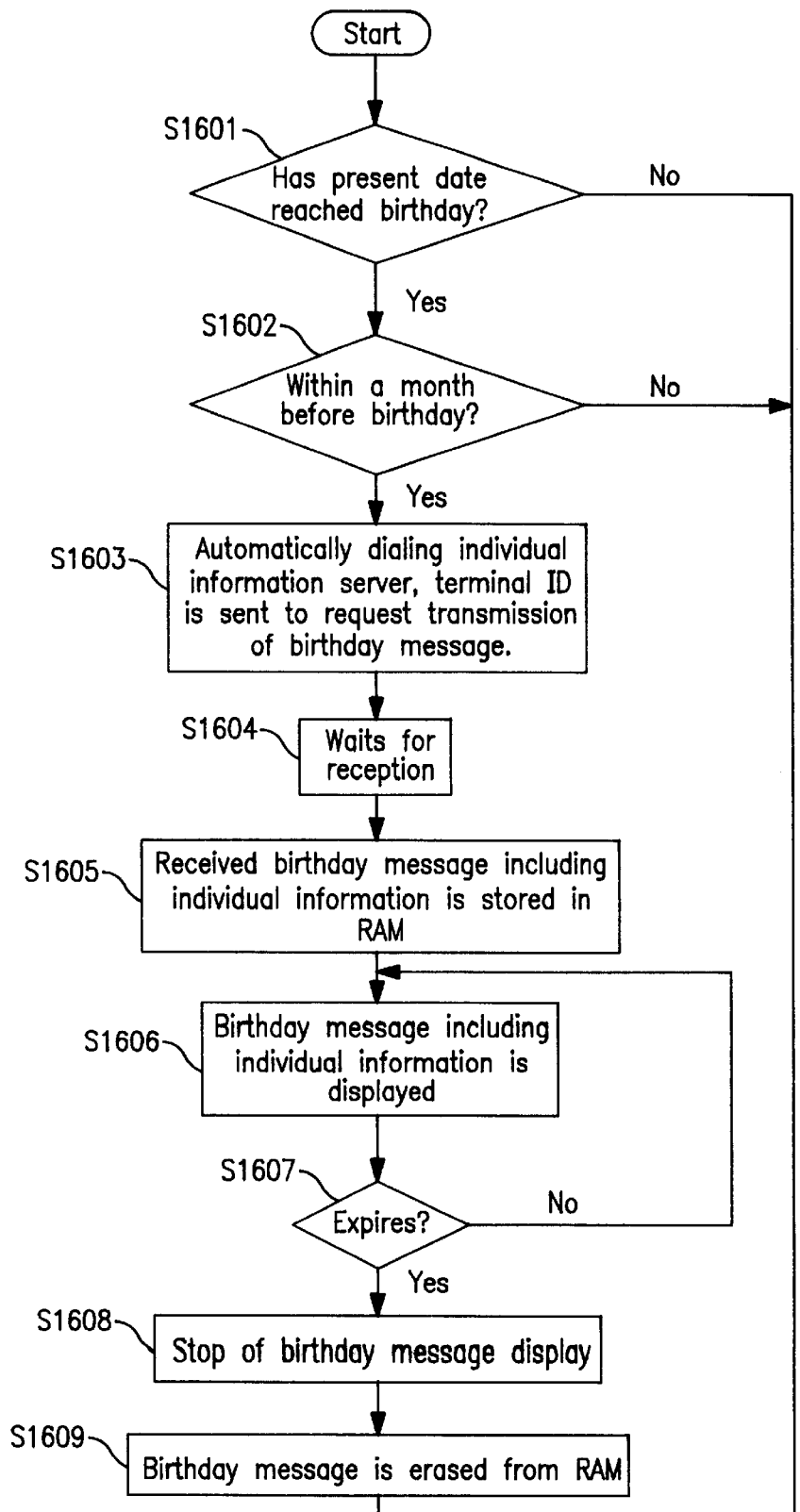

FIG. 17 is a flowchart for explaining the operation of display of birthday message including individual information in embodiment 6.

Figure 18:
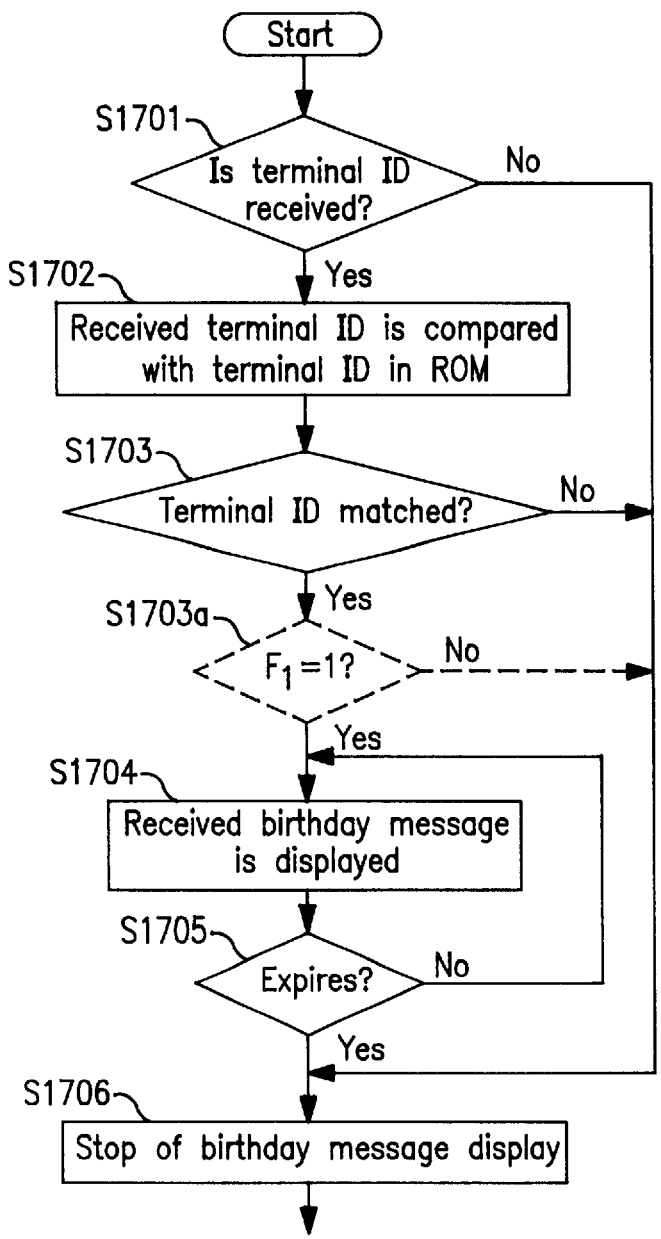

FIG. 18 is a flowchart for explaining the operation of display of birthday message in embodiment 9.

Figure 19:
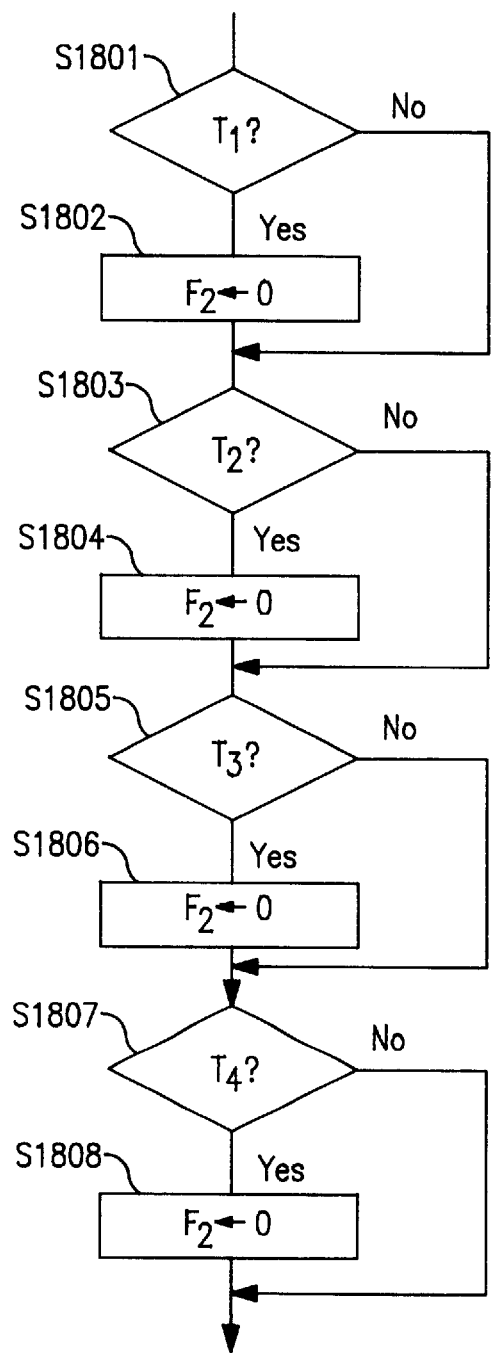

FIG. 19 is a flowchart for explaining the operation of reset of season flag by the data of turning point of seasons in embodiment 10.

Figure 20:
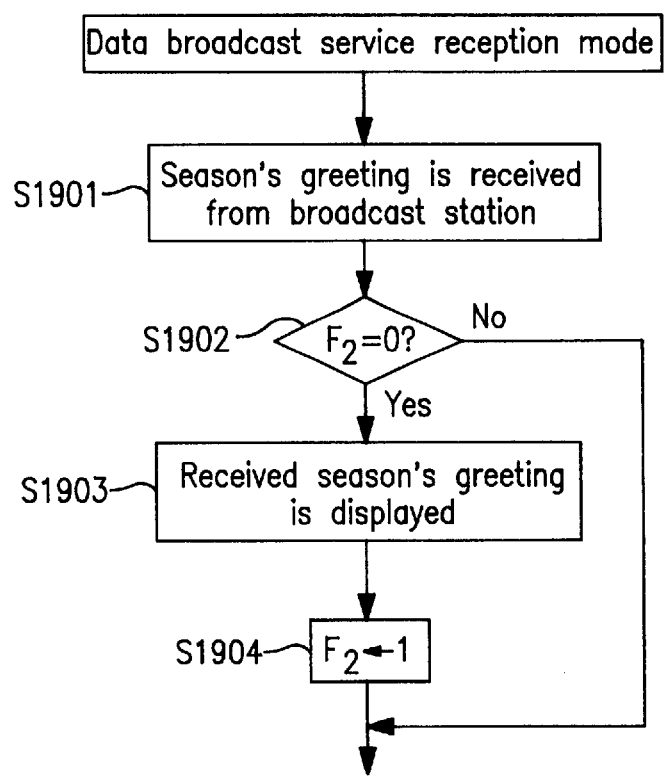

FIG. 20 is a flowchart for explaining the operation of display of season's greeting in embodiment 10.

Figure 21:
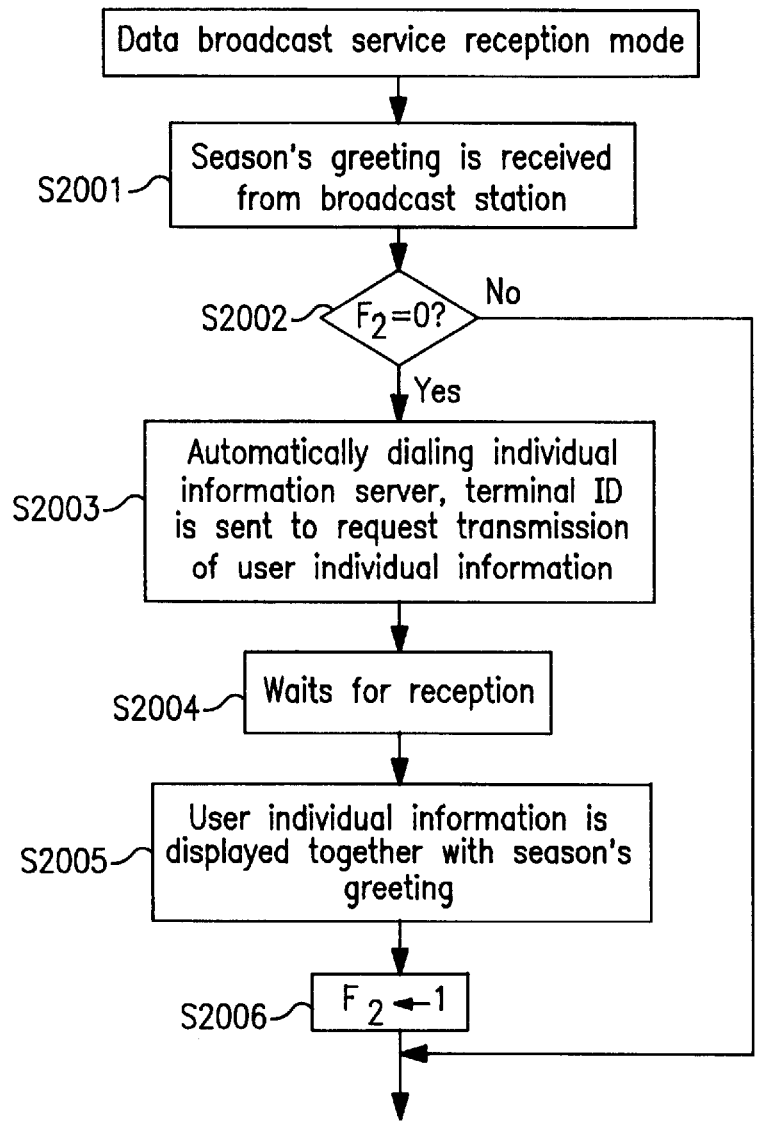

FIG. 21 is a flowchart for explaining the operation of display of season's greeting including individual information in embodiment 13.

Figure 22:
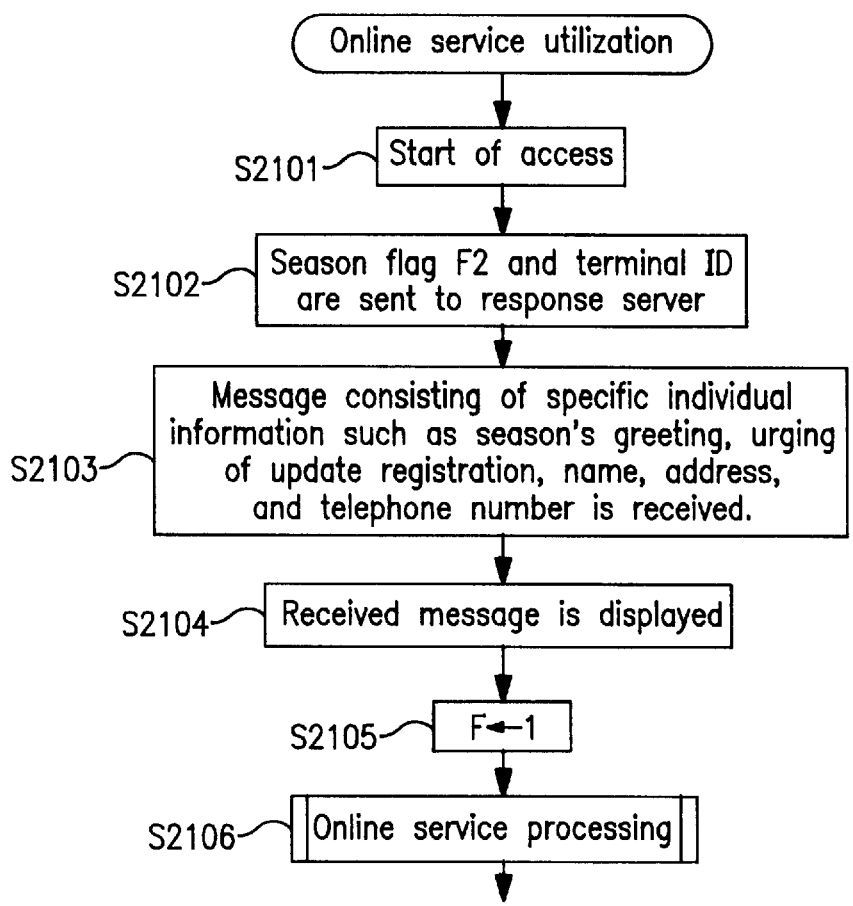

FIG. 22 is a flowchart for explaining the operation of display of season's greeting including individual information at the two-way data communication apparatus side in embodiment 14.

Figure 23:
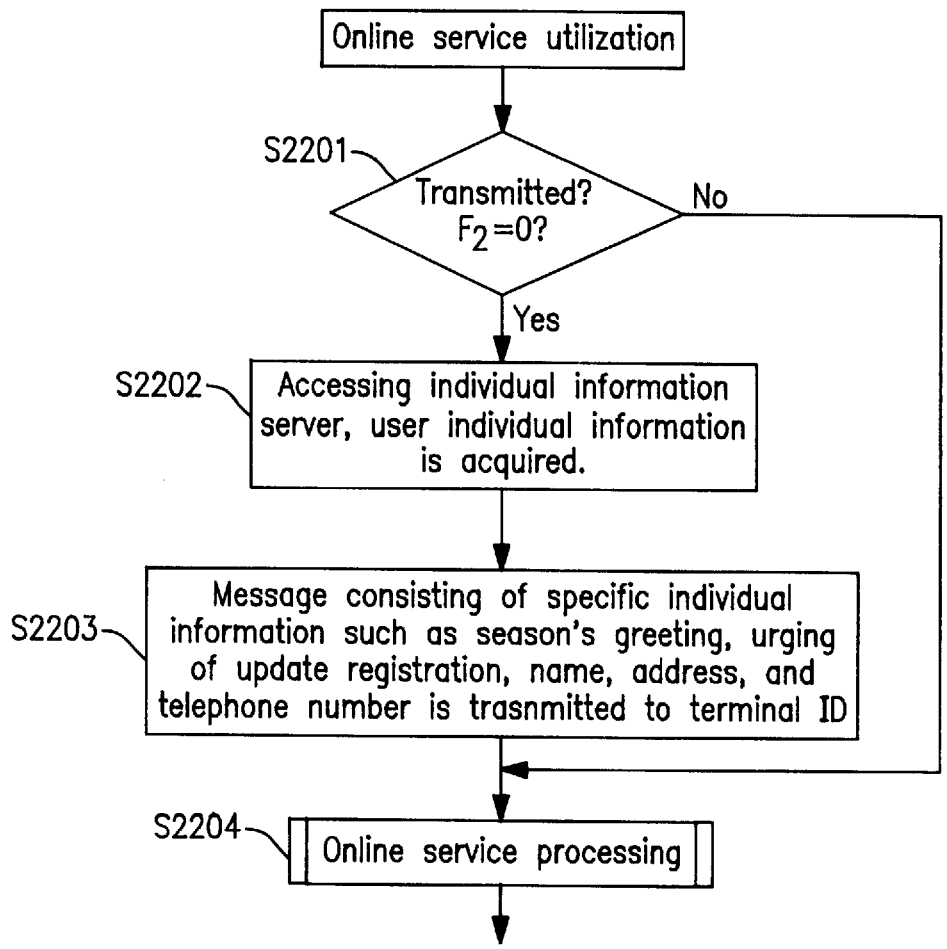

FIG. 23 is a flowchart for explaining the operation of transmission of season's greeting including individual information at the response server side in embodiment 14.

DESCRIPTION OF THE PREFERRED EMBODIMENTS (Embodiment 1)

Figure 1:
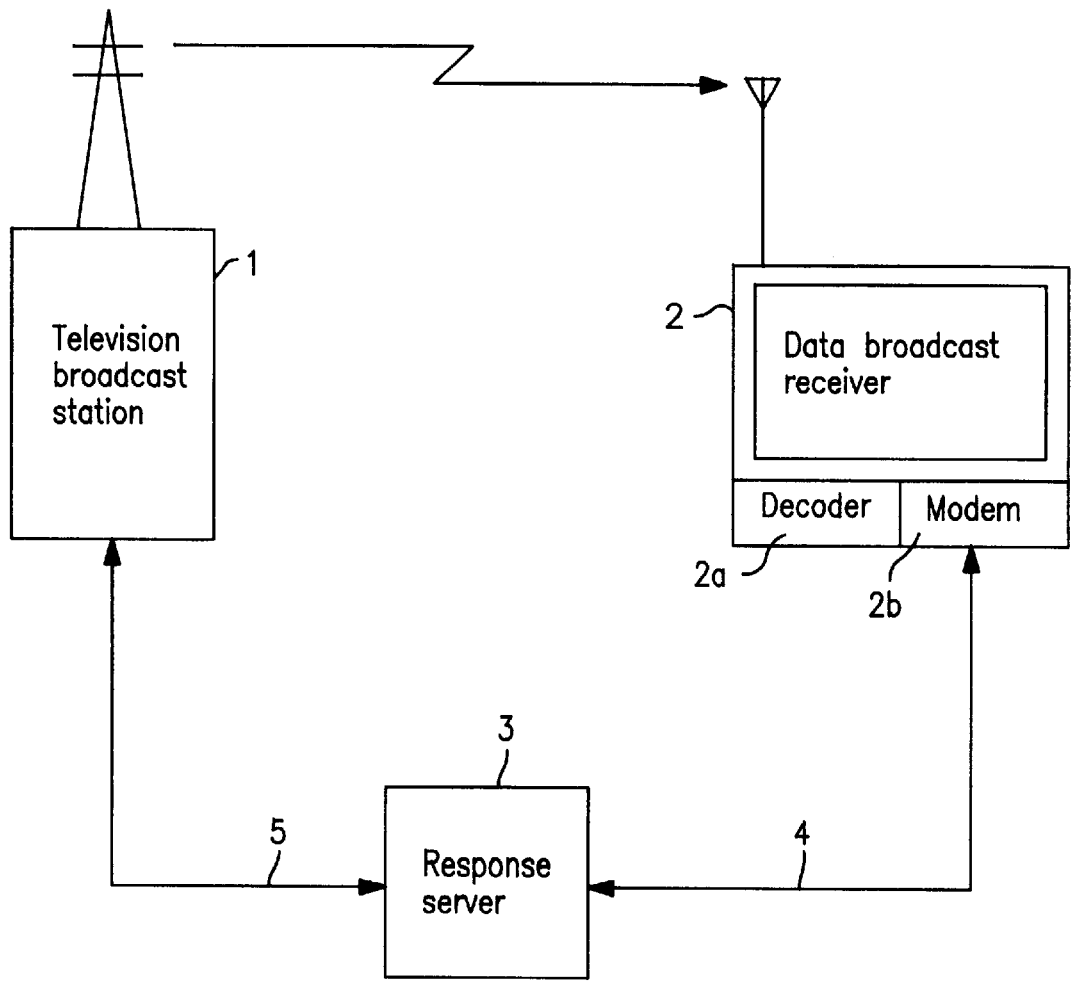
FIG. 1 is a schematic block diagram of a data broadcast receiver in a prior art.
Figure 2:
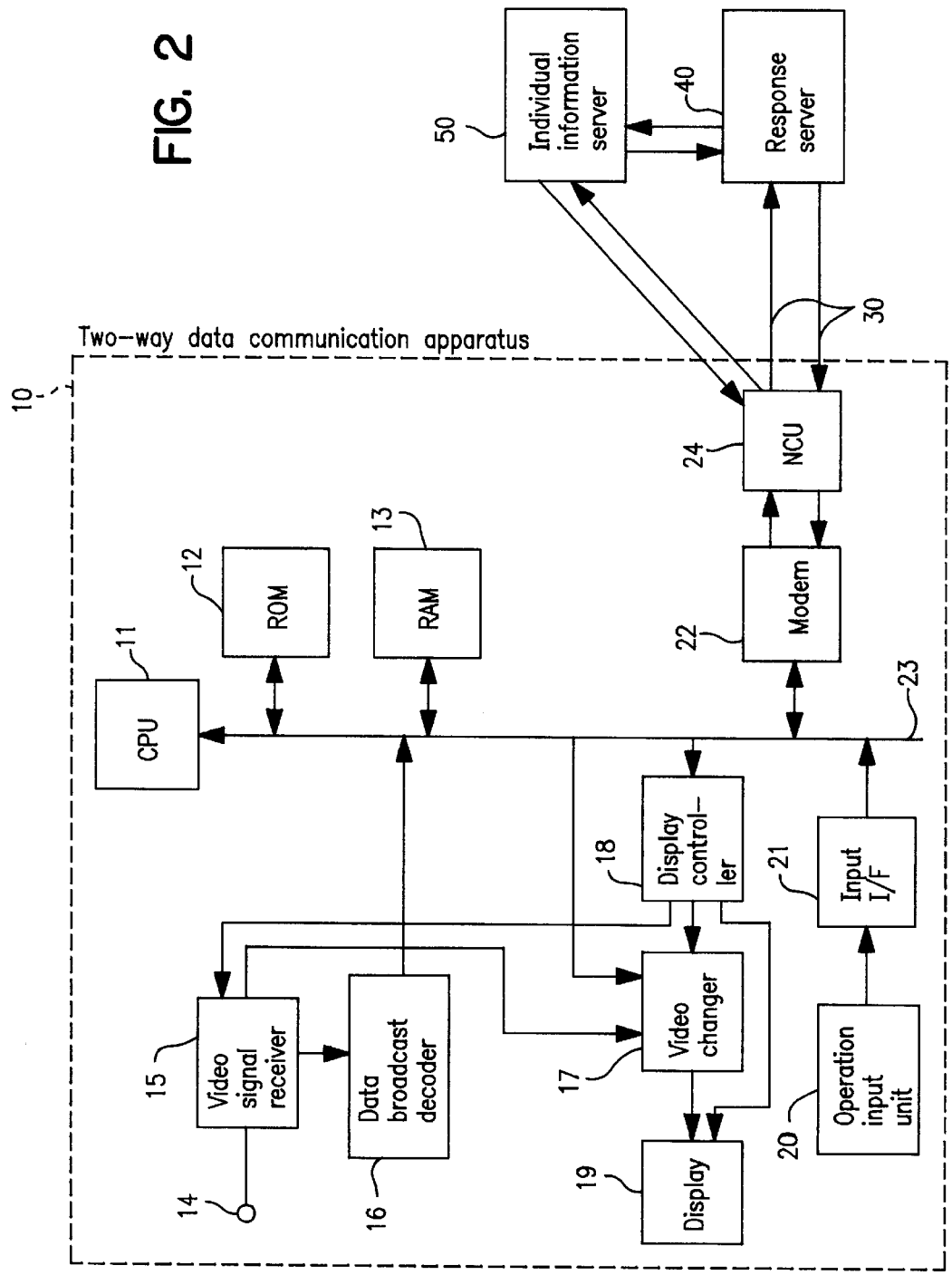
FIG. 2 is a block diagram showing an electric constitution of a two-way data communication apparatus according to embodiment 1 of the invention.

FIG. 2 is a block diagram showing an electric constitution of a two-way data communication apparatus as transmission and reception terminal of the user of two-way communication method of the embodiment.

In FIG. 2, a two-way data communication apparatus 10 is composed as follows. Reference numeral 11 is a CPU (central processing unit) responsible for control of the entire system, 12 is a ROM (read-only memory) for storing the program for that control, 13 is a RAM (random access memory) for assisting the control and operation and storing decoded data broadcast signals, 14 is an input terminal of television signals received by a receiving antenna (not shown), 15 is a video signal receiver for selecting and demodulating video signal of a desired channel from input television signals, 16 is a data broadcast decoder for separating and decoding data broadcast signal superposed in the vertical blanking period of the demodulated video signal, 17 is a video changer for changing over and sending out video signal from the video signal receiver 15 and data broadcast signal from the RAM 13, 18 is a display controller for changing over the reception channel in the channel selector in the video signal receiver 15, controlling the display state such as screen division in a display 19 or scroll of data broadcast signal, or controlling the video changer 17, 19 is a display unit such as CRT and LCD, 20 is an operation input unit such as operation panel and remote control including data input, 21 is an input interface, 22 is a modem for two-way communication with telephone circuit by converting digital data into analog audio signal level, 23 is a bus connecting the parts from CPU 11 and ROM 12 to the modem 22, and 24 is an NCU (network control unit) for connecting the modem 22 to a telephone circuit 30. Moreover, reference numeral 40 is a response server connected to the NCU 24 of the two-way data communication method 10 through the telephone circuit 30 interactively (in two ways). Reference numeral 50 is an individual information server connected to the NCU 24 of the two-way data communication apparatus 10 and the response server 40 interactively (in two ways).

First, a general operation of reception of data broadcast program is described. The video signal receiver 15 selects a station from the received television signal, sends out the television signal of the reception channel to the video changer 17 and also sends out to the data broadcast decoder 16. In the data broadcast decoder 16, the data broadcast signal superposed in the vertical blanking period of the selected video signal is separated and decoded, and is sent out to the RAM 13 to be stored temporarily. The display controller 18 controls the video changer 17, and sends out either the video signal of television broadcast from the video signal receiver 15 or the data broadcast signal being read out from the RAM 13 to the display 19. The display controller 18 also controls to display in full screen or two divided screens as the display format of the display 19, or to display character data in the bottom or top of the full screen by scrolling like superimposing. The control effected by the display controller 18 is determined by the input command from the operation input unit 20.

When the program of data broadcast is quiz show, variety program or opinion survey participated by viewers, the user manipulates to select one out of preset replies, and commands automatic dialing, then the CPU 11 dials the response server 40 automatically through the modem 22, NCU 24, and telephone circuit 30, and presents the reply information to the response server 40. The response server 40 processes the information if necessary, and sends the result to the broadcast station through telephone circuit.

Figure 3:
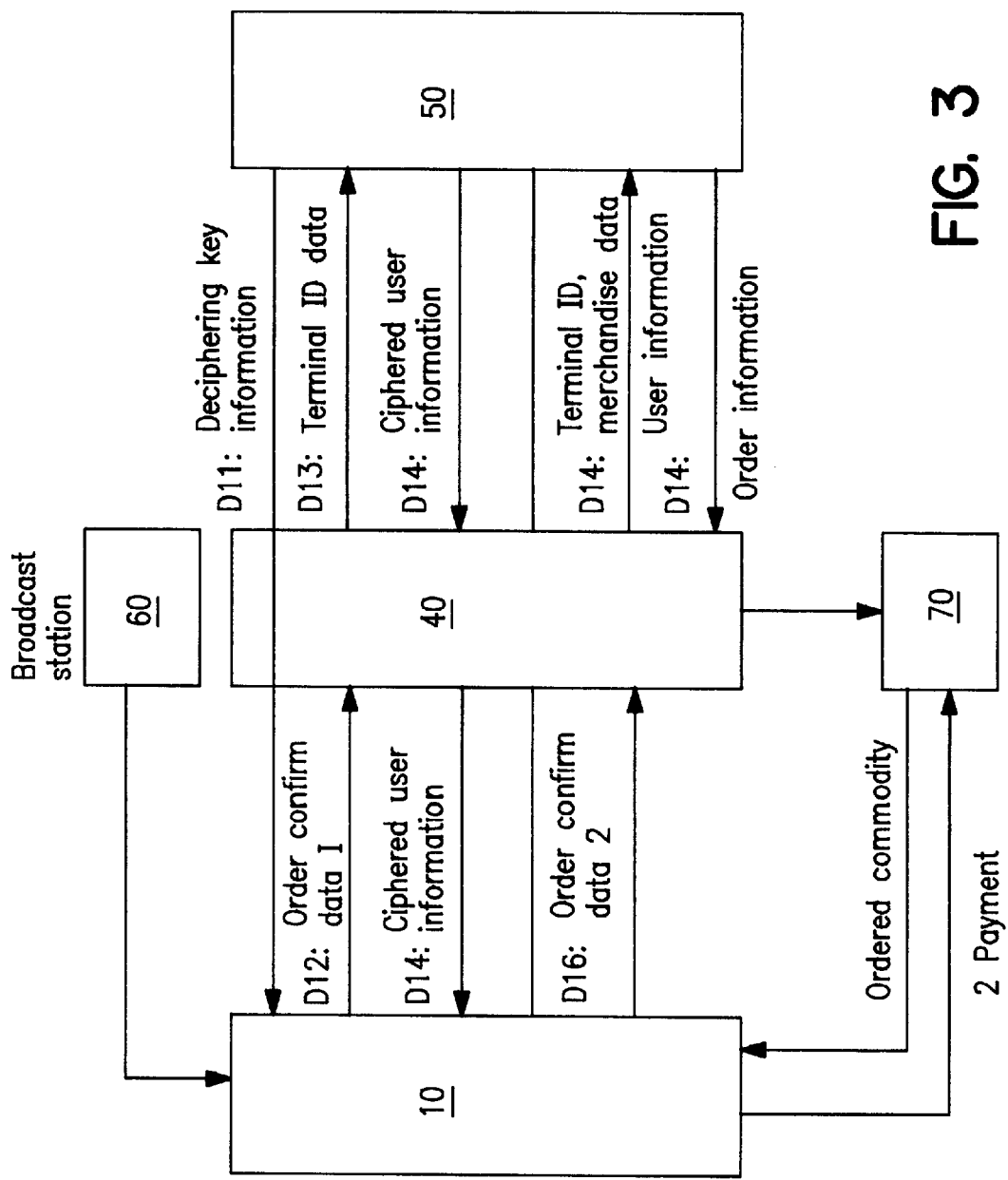
FIG. 3 is an operation explanatory diagram of embodiment 1.
Figure 5A:
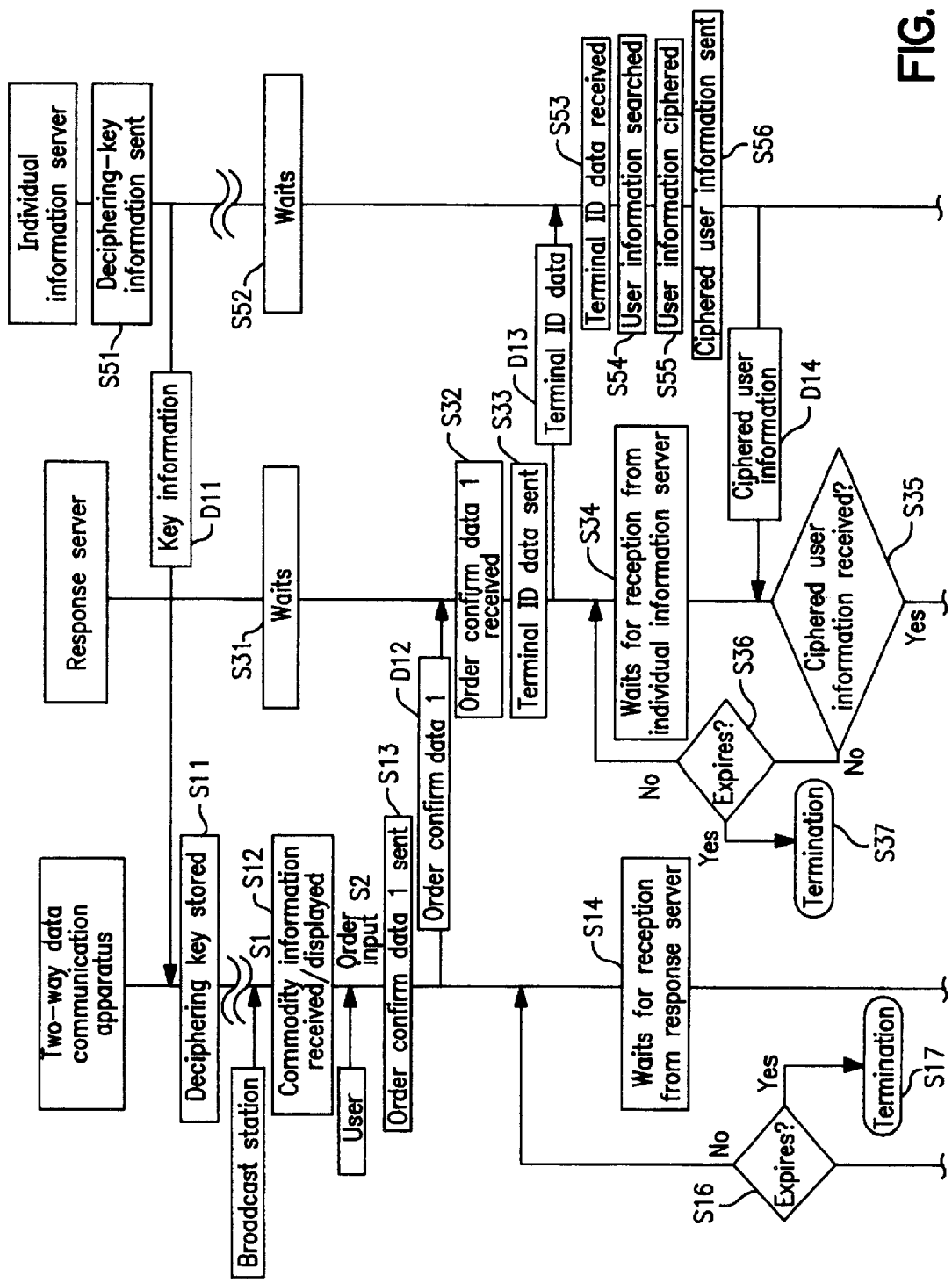
FIG. 5 is a flowchart for explaining the operation of embodiment 1.

Next is explained the operation for ordering merchandise by connecting the two-way data communication apparatus 10 to the response server 40 and individual information server 50 through telephone circuit 30, by referring to FIGS. 3, 4 and 5.

FIG. 3 shows the data exchange in this case, FIG. 4 shows the data content, and FIG. 5 shows the time series of data exchange.

The action of the user is described, to begin with.

At the user's terminal, in order to protect the user, the key information for deciphering the cipher from the individual information server 50 holding the individual information in batch is stored (step S11).

Commodity information is presented through television broadcast station 60 or telephone circuit, and this broadcast is received and displayed (step S12). By confirming the order, order confirm data 1 (composed of terminal ID and user ID) in FIG. 4 is sent to the response server 40 (step S13). In this stage, it is not necessary to transmit specific order information. The response server 40 acts to bridge among the user, the distributor who actually sells the commodity, various service outlets, or information provider, and the broadcast station through television broadcast or telephone circuit, and exists in a plurality.

Once the telephone connection is cut off, waiting for reception from the response server 40 (step S14), if ciphered user information is not received within a specific time, it is terminated (steps S16, S17). When ciphered user information is received (step S15), using the previously received deciphering key information, the ciphered user information is deciphered (step S18), so that the user information is displayed (step S19). As a result, the user confirms that the order is received.

By requesting connection to the response server 40 and sending order confirm data 2 (terminal ID, user ID, password, ordered commodity information), a specific order is made (step S20). This ends the order processing (step S21).

Next, the operation of the response server 40 is described.

The response server 40 is ready to receive connection from the terminal of the individual user through telephone circuit (step S31). Confirming the connection from the individual user and receiving the order confirm data 1 (step S32), the terminal ID is extracted therefrom and sent to the individual information server 50 (step S33).

Waiting for transmission from the individual information server 50 (step S34), if not received within specific time, the circuit is cut off (steps S36, S37).

When receiving ciphered user information (information composed of service outlet code, terminal ID, user ID, ciphered individual address, name, etc.) from the individual information server 50 (step S38), it is transferred to the user. When receiving order confirm data from the user (step S39), the ciphered terminal ID and merchandise data (composed of terminal ID, user ID, ciphered password, ordered commodity information) is extracted, and sent to the individual information server 50 (step S40). Waiting for reception from the individual information server 50 (step S41), if not received within specific time, processing is terminated (steps S43, S44).

When user information (name, telephone number, address, etc.) is received from the individual information server 50, it is sent to the commodity distributor or the like as order information (step S45), and the order entry process is over (step S46). The commodity distributor 70 or the like receives it, and ships the commodity to the individual user, and collects the payment from the user.

Or, the credit card number may be presented as user information, and the payment may be completed.

Herein, if the order confirm data 1, 2 and user information are collated in the response server, since the ciphering method is not always the same, if a user having a specific address and name purchases a specific commodity by one order, it can be confirmed, but by a next order, when order confirm data 1, 2 are received, the ordering user cannot be identified, so that the security of the user can be protected.

Then, the operation of the individual information server 50 is described.

The individual information server 50 sends the deciphering key information to the individual users (step S51), and is waiting for reception from the response server (step S52).

The deciphering key information may be either presented periodically to the user, or presented upon every entry of order.

When terminal ID data is received from the response server 40 (step S53), user information is retrieved from the database provided in the individual information server 50 (step S54), and it is ciphered (step S55), and ciphered user information (information composed of service outlet code, terminal ID, user ID, ciphered individual address, name, etc.) is sent to the response server 40 (step S56).

When it is transmitted to the user through the response server 40, it is an order confirmation to the user, and the specific order from the user is received through the response server as terminal ID and merchandise data (step S57), and the user information is retrieved from the database (step S58), and it is transmitted to the response server 40 (step S59). This ends the operation of the individual information server 50 of one order.

Ciphering is determined by the speed of data communication and magnitude of individual information.

The individual information is presented twice to the response server 40, but the method of presentation is not limited to the manner in the embodiment. It does not matter, for example, if more information is ciphered in the first data transmission (order confirm data 1).

(Embodiment 2)

The electric constitution of the two-way data communication apparatus of the embodiment is same as the constitution of the first embodiment shown in FIG. 2, and the description of the constitution in FIG. 2 is hence omitted. The operation is described below while referring to the flowcharts in FIG. 6 and FIG. 7.

First, a general operation of reception of data broadcast program is described. The video signal receiver 15 in FIG. 2 selects a station from the received television signal, sends out the television signal of the reception channel to the video changer 17 and also sends out to the data broadcast decoder 16. In the data broadcast decoder 16, the data broadcast signal superposed in the vertical blanking period of the selected video signal is separated and decoded, and is sent out to the RAM 13 to be stored temporarily. The display controller 18 controls the video changer 17, and sends out either the video signal of television broadcast from the video signal receiver 15 or the data broadcast signal being read out from the RAM 13 to the display 19. The display controller 18 also controls to display in full screen or two divided screens as the display format of the display 19, or to display character data in the bottom or top of the full screen by scrolling like superimposing. The control effected by the display controller 18 is determined by the input command from the operation input unit 20.

When the program of data broadcast is quiz show, variety program or opinion survey participated by viewers, the user manipulates to select one out of preset replies, and commands automatic dialing, then the CPU 11 dials the response server 40 automatically through the modem 22, NCU 24, and telephone circuit 30. and presents the reply information to the response server 40. The response server 40 processes the information if necessary, and sends the result to the broadcast station through telephone circuit.

Next is explained the operation for registering by connecting the two-way data communication apparatus 10 to the individual information server 50 through the telephone circuit 30.

Figure 6:
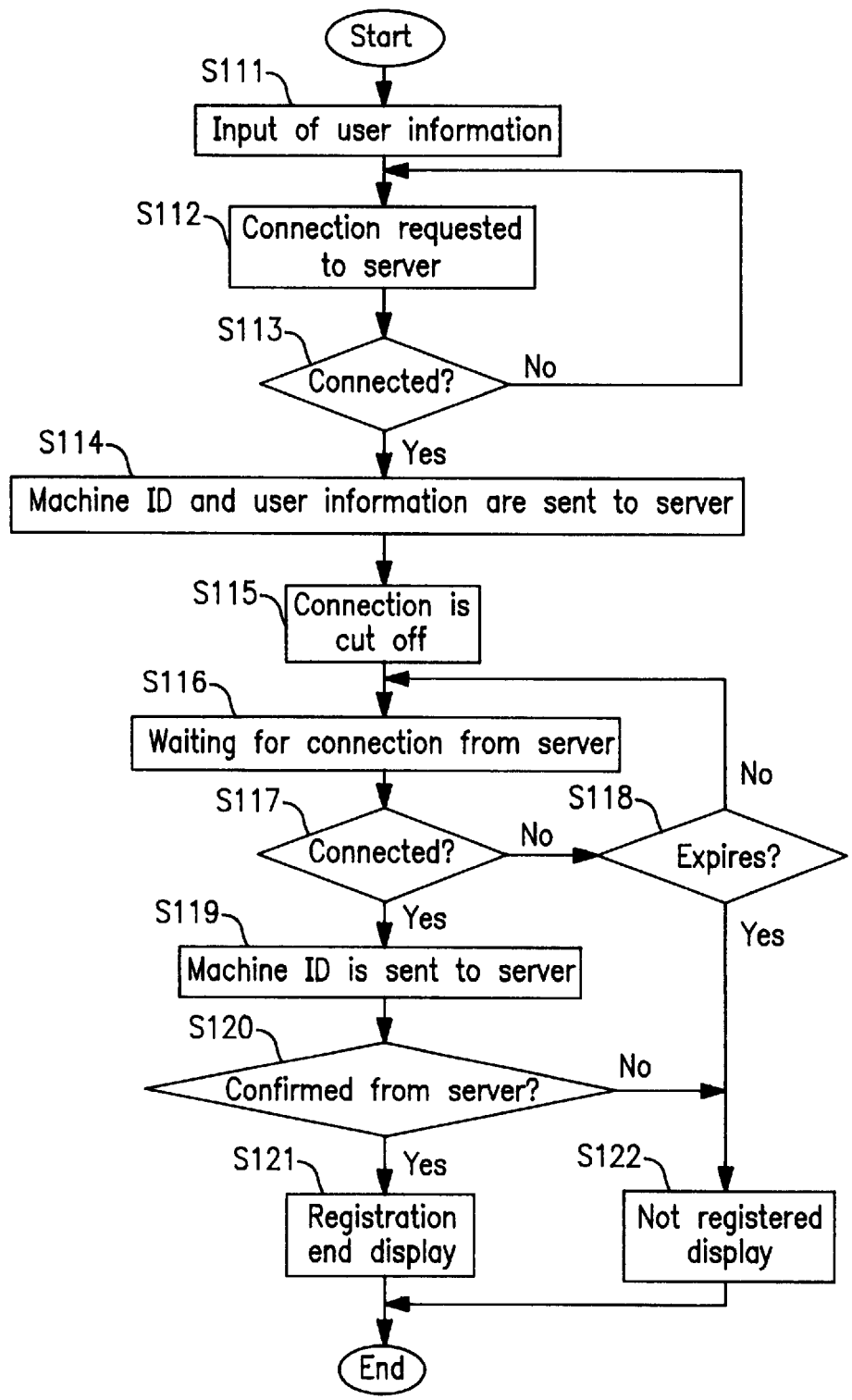
FIG. 6 is a flowchart for explaining the operation of embodiment 2.

The action of the individual user is explained by reference to the flowchart in FIG. 6.

The user enters the user information in the individual information server 50 through the user's telephone circuit (step S111), and requests connection to the individual information server 50 (step S112).

Confirming the connection (step S113), if connection is not successful, connection is requested again (step S112).

As a result, the machine ID of data broadcast receiver and user information are sent to the server (step S114), and the telephone circuit is once cut off (step S115). After a specific time (S116), the telephone circuit is connected according to the user information from the individual information server (step S117), and when connected, the machine ID is sent to the server (step S119), and is collated and confirmed from the server (step S120), and when confirmed and collated, completion of registration is displayed (step S121). If not connected within specific time (step S118), failure of registration is displayed (step S122).

Figure 7:
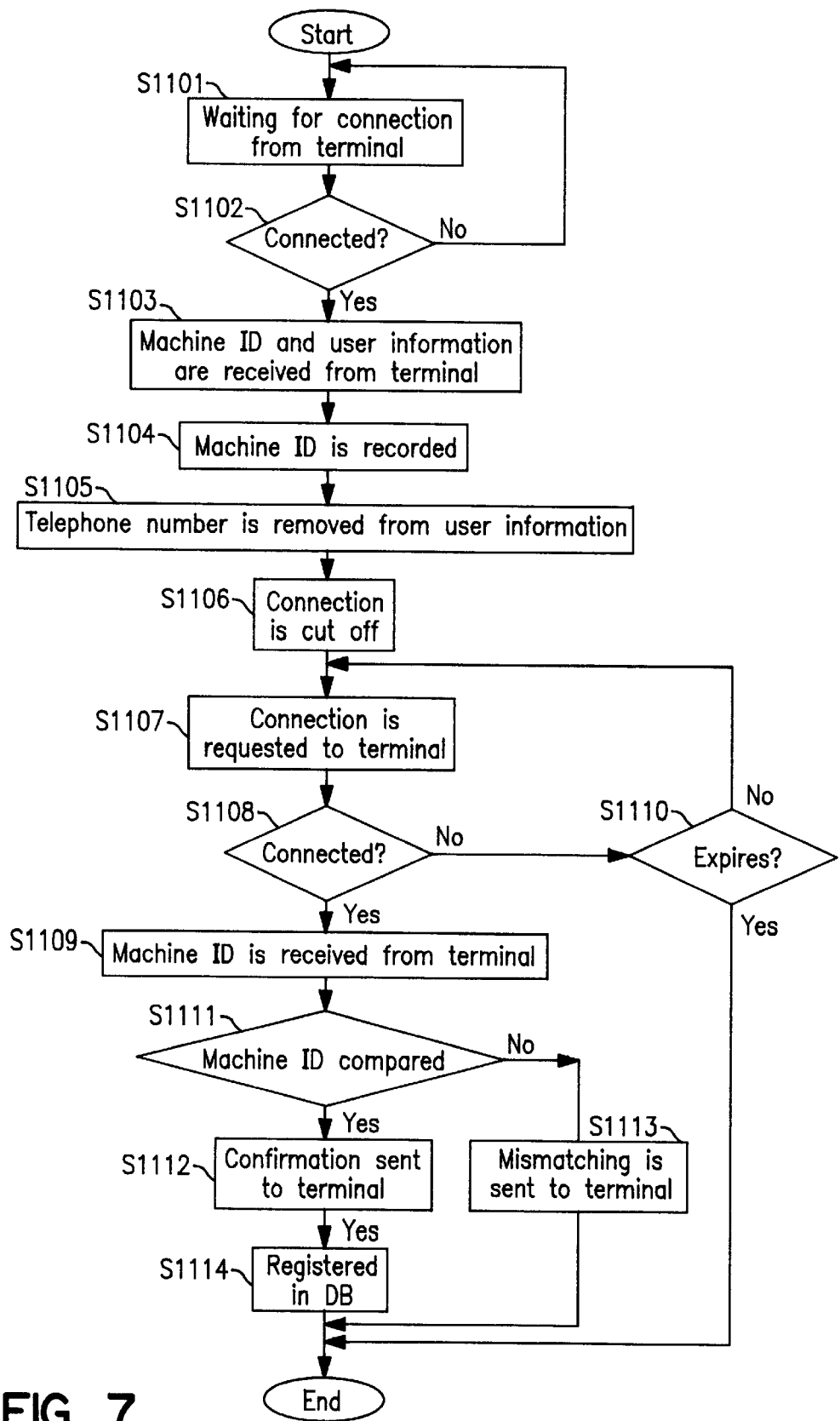
FIG. 7 is a flowchart for explaining the operation of embodiment 2.

Referring next to the flowchart in FIG. 7, the operation of the individual information server is described below.

The individual information server 50 is ready to receive connection from the terminal of the individual user through the telephone circuit (step S1101). Confirming connection from the individual user (step S1102), the machine ID and user information are received in the server (step S1103), and the machine ID is recorded (step S1104). Further, extracting the telephone number from the user information (step S1105), the telephone circuit is once cut off (step S1106). After a specific time, connection of telephone circuit is requested on the basis of the individual user information from the individual information server 50 (step S1107), connection is confirmed (step S1108), and when connected, the machine ID is received (step S1109), and collated (step Sllll), and confirmation is sent to the individual terminal (step S1112) to complete the registration. If the machine ID is not collated, mismatching is sent to the individual terminal (step S1113). Hence, the individual information server or the user can cut off the connection of telephone circuit.

If not connected (step S1110), the process returns to request for connection (step S1107).

(Embodiment 3)

Figure 8:
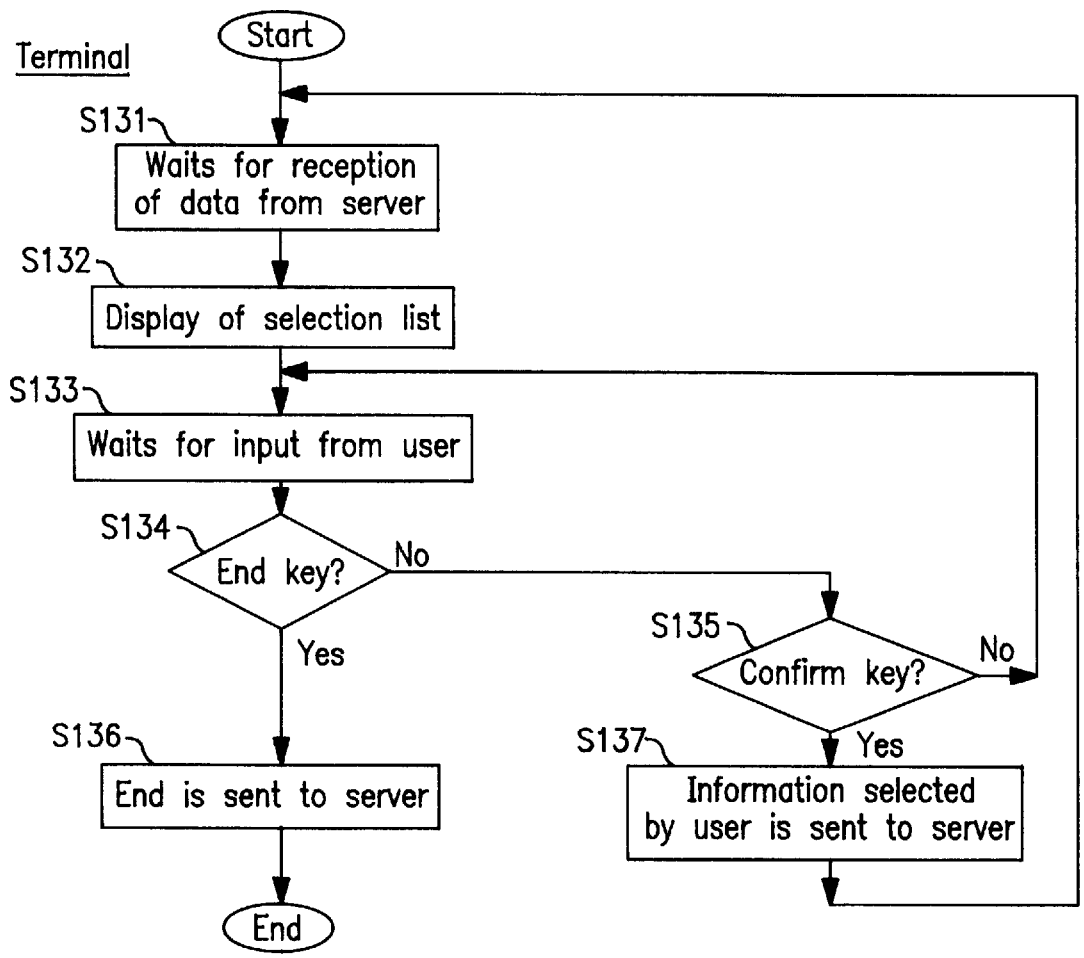
FIG. 8 is a flowchart for explaining the operation of embodiment 3.
Figure 9:
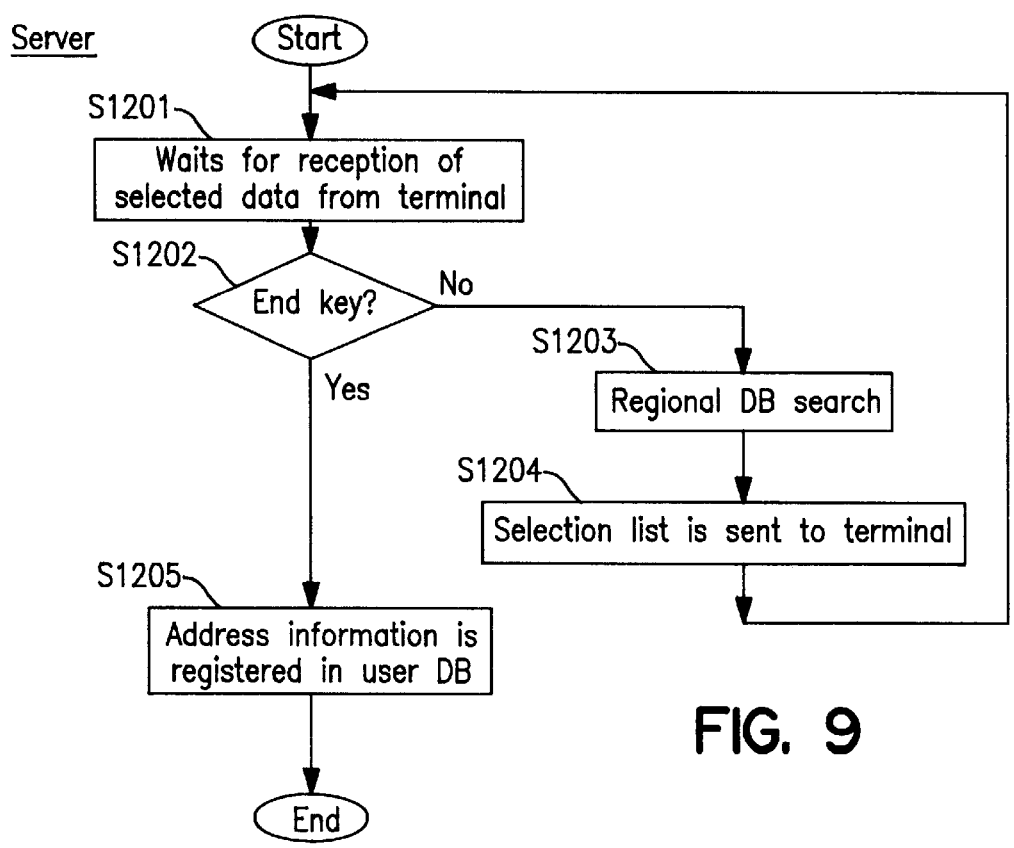
FIG. 9 is a flowchart for explaining the operation of embodiment 3.
Figure 10B:
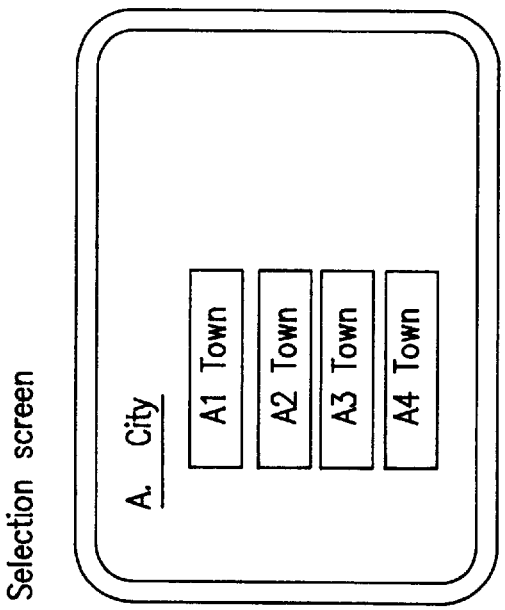
FIGS. 10 are a diagrams for explaining the operation of selecting method of embodiment 3.
Figure 10A:
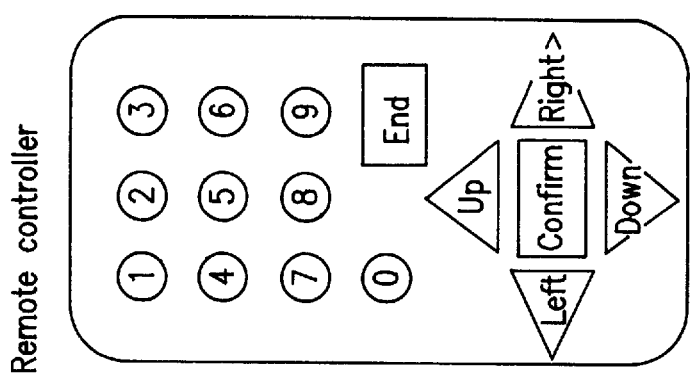

The manner of registration is described by referring to FIGS. 8, 9, 10.

The action of the individual user is first explained by reference to FIG. 8. The user enters the user information in the individual information server 50 through the user's telephone circuit.

The user, when connected to the individual information server 50, waits until data is sent from the server 50 (step S131), and a list of prefecture names, city names and town names is received and displayed (step S132), so that the user can select the own prefecture name, city name, and town name (step S133).

By further pressing confirm key (step S135), the selected information is sent to the server 50, and more specific address data is transmitted from the server 50.

By transmitting by repeating this operation, the address is specified, and is sent to the server 50.

The operation of the individual information server is described below while referring to the flow chart in FIG. 9.

The server 50 presents the address information to the individual user through the telephone circuit, and waits for transmission from the individual user (step S1201), and when receiving the user's selection, it retrieves the regional database (DB) (step S1203), and sends more specific address information to the individual terminal (step S1204).

When the address is specified by repeating this operation, it is terminal (step S1202), and the address information is registered in the user database (step S1205).

The address database may be provided in the terminal itself.

Herein, FIG. 10 shows the manner of selection by the user, and the address is specified by selecting the screen as shown in FIG. 10(*b*) by the cursor.

The address database is built in a hierarchical structure as shown in FIG. 11, and a more specified address list is designated by selection by the user.

(Embodiment 4)

This is to explain the operation of updating the individual data by connecting the two-way data communication apparatus 10 to the individual information server 50 through the telephone circuit 30.

The action of the individual user is described according to the flowchart in FIG. 12.

Suppose the user has changed the user information such as telephone number or machine ID of two-way data communication apparatus 10, or address, and when the procedure is complete, a change flag is not set up (step S141). and if not set up, it means the state of waiting for connection from the individual information server 50 (step S142).

If the change flag is set up, it is known that the change registration in the individual information server 50 is not finished, and the procedure is completed (step S141).

When connected (step S143), the changed user information is sent to the individual information server 50 through telephone circuit, and procedure is complete (steps S145, S147).

The specific flow of this procedure is as mentioned in the foregoing embodiments.

If not connected, it is judged that the change registration in the individual information server is not finished, and the procedure is completed (step S146).

According to the flowchart in FIG. 13, the operation of the individual information server is described.

The individual information server 50 requests connection from the terminal of the individual user through the telephone circuit (step S1302), and when confirming connection (step S1303), it receives the machine ID and user information (step S1304), and compares the user information such as machine ID of database of individual information server (step S1305).

If impossible to collate, a change flag is set up on the database of individual information server, and connection is terminated.

When the user information is not changed, or when reregistering changed information, this information is stored, and the procedure is completed. A specific flow of this procedure is same as the flowchart in FIG. 6 relating to embodiment 2, and in FIG. 8 (step S131), completion of registration is displayed, and the state is at the same time changed to be in the absence of change flag. The operation of the individual information server at the time of re-registration is same as in the flowchart in FIG. 9, and in FIG. 9 (step S1205), registering in the database, the state is changed to be in the absence of change flag on the user databases.

If impossible to collate, a change flag is set up on the database of the individual information server, and connection is terminated.

Aside from the change of user information started by request of connection of individual information server 50, as the user requests connection periodically, the individual information such as machine ID, address and telephone number can be changed periodically.

Hereinafter, the embodiments of the two-way data communication apparatus of the invention are described below while referring to the accompanying drawings.

(Embodiment 5)

FIG. 14 is a block diagram showing an electric constitution of a two-way data communication apparatus according to embodiment 5.

In FIG. 14, those having the same functions as in embodiments 1, 2, 3 and 4 are identified with same reference numerals. Description of constitution of same functions is omitted.

Meanwhile, reference numeral 40 is a response server connected to an NCU 24 of a two-way communication apparatus 10 through a telephone circuit 30 interactively (in two ways), 50 is an individual information server connected to the NCU 24 of the two-way data communication apparatus 10 and response server 40 through the telephone circuit 30 interactively (in two ways), and 60 is a television broadcast station. Although not shown in the drawing, there are plural response servers 40, and each response server 40 is connected to the individual information server 50 through the telephone circuit 30. Each response server 40 and individual information server 50 are connected to the television broadcast station 60 through the telephone circuit 30.

First, operation of initial registration of user individual information is described. Usually, when the two-way data communication apparatus 10 is purchased, or when contracting an online service, the user individual information is initially registered in the individual information server 50. This initial registration is entered through the telephone circuit 30. That is, the user manipulates the operation input unit 20 to display the menu of individual information registration on the display 19, and operates the keys to send the user registration request and terminal ID to the individual information server 50 through the modem 22 and telephone circuit 30. The terminal ID is stored in the ROM 12. Receiving this information, the individual information server 50 downloads the registration program in the two-way data communication apparatus 10 through the telephone circuit 30. This program is stored in the RAM 13. By key operation, the user enters the individual information such as name, address, telephone number, date of birth and sex. The individual information is sent out to the individual information server 50 through the telephone circuit 30, and is stored in the hard disk. The birthday based on the date of birth of the individual information is registered in the RAM 13 of the two-way data communication apparatus 10. Dialing automatically by the registered telephone number from the individual information server 50, completion of registration is confirmed, and the user ID is sent out from the individual information server 50, and the two-way data communication apparatus 10 registers the received user ID in the RAM 13, and erases the registration program. Or, the registration program may be preliminarily stored in the memory of the terminal, and without having to download from the individual information server, the individual information may be entered by the terminal, and then registered in the individual information server through the telephone circuit.

In this way, the user individual information such as name, address and telephone number is registered in the individual information server 50 together with the user ID, and the birthday of the user is registered as a specific date in the RAM 13 of the two-way data communication apparatus 10.

Next, a general operation of reception of data broadcast program is described. The video signal receiver 15 selects a station from the received television signal, sends out the television signal of the reception channel to the video changer 17 and also sends out to the data broadcast decoder 16. In the data broadcast decoder 16, the data broadcast signal superposed in the vertical blanking period of the selected video signal is separated and decoded, and is sent out to the RAM 13 to be stored temporarily. The display controller 18 controls the video changer 17, and sends out either the video signal of television broadcast from the video signal receiver 15 or the data broadcast signal being read out from the RAM 13 to the display 19. The display controller 18 also controls to display in full screen or two divided screens as the display format of the display 19, or to display character data in the bottom or top of the full screen by scrolling like superimposing. The control effected by the display controller 18 is determined by the input command from the operation input unit 20.

When the program of data broadcast is quiz show, variety program or opinion survey participated by viewers, the user manipulates to select one out of preset replies, and commands automatic dialing, then the CPU 11 dials the response server 40 automatically through the modem 22, NCU 24, and telephone circuit 30, and presents the reply information to the response server 40. The response server 40 processes the information if necessary, and sends the result to the broadcast station 60 through telephone circuit.

Operation of online shopping by viewing the program of television broadcast or the information transmitted from the response server is briefly described below. The transmitted merchandise information is shown in the display 19. When order confirm is instructed by manipulation of the operation input unit 20, order confirm data (terminal ID, user ID, password, ordered merchandise information) is sent to the response server 40 through the telephone circuit 30, and order processing is complete. The response server 40 sends the terminal ID to the individual information server 50, and receives the user individual information (name, address, telephone number, etc.) from the individual information server 50, and it is sent to the merchandise distributor or the like as the order information, and order entry processing is over. The merchandise distributor ships the ordered merchandise to the corresponding user according to the user individual information, and collects the payment from the user.

Operation of display of birthday message is described below. As already explained, the data of birthday of the user is registered in the RAM 13 of the two-way data communication apparatus 10, and in the individual information server 50, together with the user ID, the user individual information such as name, address and telephone number are registered. From the television broadcast station 60, the birthday message is always transmitted on the broadcast wave. This birthday message includes, together with the greeting of the birthday, a message urging to update the registration along with change in the user individual information. For example, the message says, "Happy birthday! If there is any change in your name, address or telephone number, please update your registration." The birthday message is superposed in the vertical blanking period of broadcast wave. This birthday message is always received in the two-way data communication apparatus 10, but is not displayed until the birthday.

As shown in the flowchart in FIG. 15, when the power source of the two-way data communication apparatus 10 is turned on, the CPU 11 judges if the present date clocked by the built-in timer has reached the birthday registered in the RAM 13, that is, the birthday or a later day (step S151), and if not reaching, display of birthday message is banned (step S155), and when reaching the birthday, it is judged if it is within one month from birthday or not (step S152), and if it is within one month, the birthday message decoded in the data broadcast decoder 16 is displayed in the display 19 (step S153). That is, for one month from the birthday, every time the power source of the two-way data communication apparatus 10 is turned on, the birthday message is displayed. Waiting until expiring (step S154), display of birthday message is banned (stopped) (step S155). Seeing this birthday message, the user is urged to judge if the present individual information such as name, address and telephone number is changed from the name, address and telephone number registered in the individual information server 50, and is encouraged to update the registration if changed. When exceeding one month from the birthday, it is understood that the message is sufficiently transmitted to the user, and the birthday message is no longer displayed (step S155).

If the individual information has been changed, the user updates the registration of individual information in the individual information server 50. Hence, presentation of online service can be received successively.

Incidentally, display of birthday message for one month from the birthday may be annoying to the user. It is canceled by the operation shown in the flowchart in FIG. 16(a). Wishing not to display the birthday message, the user manipulates the erase key on the operation input unit 20 (remote controller). The CPU 11 judges if the erase key has been manipulated or not (step S1401), and if manipulated, display flag $F_1$ is reset (step S1402). Then, in the flowchart in FIG. 15, step F152a is added, so that the birthday message is displayed only when the display flag $F_1$ is set (step S153), while the birthday message is not displayed when the display flag $F_1$ is reset (step S155).

Figure 16B:
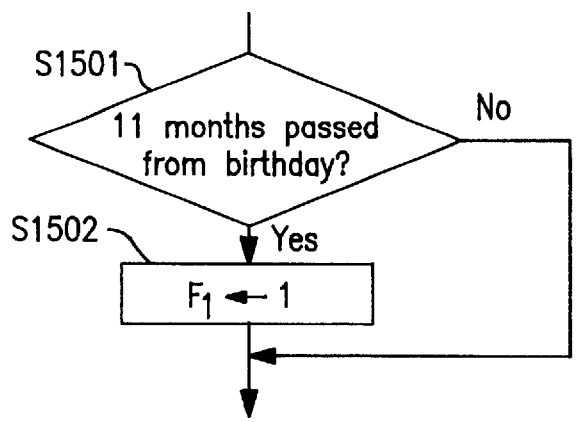

If the display flag $F_1$ remains reset, when the birthday arrives next year, the birthday message may not be displayed. Accordingly, as shown in FIG. 16(b), judging if passing 11 months, for example, from birthday (step S1501), if passing, the display flag $F_1$ is returned to the set state (step S1502). Then, the judgement at step S152a is YES, so that the birthday message may be displayed again.

(Embodiment 6)

In embodiment 5, the birthday message was "Happy birthday!

If there is any change in your name, address or telephone number, please update your registration." By contrast, it may be also considered to display specific registered individual information such as name, address and telephone number. That is, the birthday message says, for example, "Happy birthday! Your registered name, address and telephone number are . . . , . . . , . . . . Is there any change? If any, please update you registration." The birthday message of such content is displayed in embodiment 6. The birthday message containing such individual information is sent from the individual information server 50, not from the broadcast station 60. Therefore, the message is not always transmitted, but is sent only when requested.

The operation is explained in the flowchart in FIG. 17. When the power source of the two-way data communication apparatus 10 is turned on, the CPU 11 judges if the present date clocked by the built-in timer has reached the birthday registered in the RAM 13 or not (step S1601), and the operation is terminated if not reaching, and when reaching the birthday, it is judged if it is within, for example, one month from the birthday or not (step S1602), and the operation is terminated if over one month, but when within one month, the individual information server 50 is dialed automatically through the telephone circuit 30. At this time, while sending the terminal ID, transmission of birthday message is also requested (step S1603). It then waits for reception from the individual information server 50 (step S1604). The individual information server 50, when transmission of birthday message is requested from the two-way data communication apparatus 10, the birthday message including the individual information is sent to the two-way data communication apparatus 10 at the demanding terminal ID. In the two-way data communication apparatus 10, the received birthday message including the individual information is stored in the RAM 13 (step S1605), and the birthday message is displayed in the display 19 (step S1606). For a period of one month from birthday, every time the power source of the two-way data communication apparatus 10 is turned on, the birthday message is displayed. When expiring (step S1607), display of birthday message is stopped (step S1608), and the birthday message is erased from the RAM 13 (step S1609). The user reads the birthday message specifically including the individual information such as the name, address and telephone number, and can compare the present individual information such as name, address and telephone number with the individual information already registered in the individual information server 50 such as name, address and telephone number very clearly, and is strongly urged to judge if changed or not, and is encouraged to update the registration if changed. When exceeding one month from the birthday, message transmission is not requested to the individual information server 50.

After confirming the birthday message, if desired to ban the display of the birthday message for a month from birthday, it can be processed similarly as shown in FIG. 16 by manipulating the erase key.

(Embodiment 7)

Embodiment 7 is intended to receive transmission of birthday message from the response server 40 instead of the individual information server 50. In this case, the birthday message does not include specific individual information such as name, address and telephone number, but same as in the case of broadcast wave, it is a general message such as "Happy birthday! If there is any change in your name, address or telephone number, please update your registration."

In operation, at step S1603 in the flowchart in FIG. 17, the "individual information server" should be replaced by the "response server," and at step S1605, the "birthday message including individual information" should be replaced by a simple "birthday message."

(Embodiment 8)

In embodiment 8, the birthday message is not received from outside, but is issued within the two-way data communication apparatus 10. That is, the birthday message is preliminarily written in the ROM 12, and as the CPU 11 judges the date, when the present date reaches the birthday (and for a month on), the birthday message is read out from the ROM 12 and is displayed in the display 19. In this embodiment, a larger memory capacity is needed in the ROM 12, but control of message display is very simple.

(Embodiment 9)

In the foregoing embodiments 5 to 8, the birthday data is registered in the RAM 13 by manipulation of the operation input unit 20. This is because whether the present date has reached the birthday is judged in the two-way data communication apparatus 10. It is based on the idea that it is natural to register the birthday in the two-way data communication apparatus 10 because the birthday is the date of birth of the user of the two-way data communication apparatus 10. However, if the power supply is stopped, or the power cord is unplugged, the data of the birthday may be deleted from the RAM 13. In such a case, manipulation for registration of birthday is needed again, but it is annoying for the user or it may be forgotten.

Here arises an idea of registering the data of birthday in the individual information server 50 to have judgement of birthday managed by the individual information server 50. Embodiment 9 conforms to this idea as described below.

In the individual information server 50, suppose the user individual information such as the date of birth of the user (birthday) and terminal ID be registered aside from the name, address and telephone number. The CPU in the individual information server 50 judges if the present date clocked by the built-in timer has reached the registered birthday or not, and when reaching, the corresponding terminal ID and message broadcast command are sent out to the broadcast station 60. The broadcast station 60 sends out the received terminal ID and birthday message on the broadcast wave. This process is executed, in principle, for a month from the birthday.

The operation is described according to the flowchart in FIG. 18. In the two-way data communication apparatus 10, the CPU 11 judges, when the power is turned on, if the terminal ID is received from the broadcast station 60 or not (step S1701), and when received, the received terminal ID is compared with the terminal ID being read out from the ROM 12 (step S1702). As a result of comparison, when two terminal IDs are matched (YES at step S1703), the birthday message received from the broadcast station 60 is displayed in the display 19 (step S1704). At this time, the birthday message is ordinary, saying, for example same as above, "Happy birthday! If there is any change in your name, address or telephone number, please update your registration."

(Embodiment 10)

In the type of not registering the birthday date in the RAM 13 of the two-way data communication apparatus 10, a method of displaying the birthday message including the individual information as the birthday message may be also considered. It is embodiment 10. The birthday message including the individual information is acquired by access to the individual information server 50. That is, in succession to steps S1701 to S1703 in FIG. 18, it is constituted to execute steps S1603 to S1609 in FIG. 17.

In the two-way data communication apparatus 10, the CPU 11 judges if the terminal ID is received from the broadcast station 60 or not when the power source is turned on (step S1701), and when received, the received terminal ID and the terminal ID being read out from the ROM 12 are compared (step S1702). As a result of comparison, when the two terminal IDs are matched (YES at step S1703), the individual information server 50 is dialed automatically through the telephone circuit 30. At this time, as shown in FIG. 17, transmission of birthday message is requested together with terminal ID (step S1603). Then the apparatus waits for reception from the individual information server 50 (step S1604). The individual information server 50, when transmission of birthday message is requested from the two-way data communication apparatus 10, sends the birthday message including the individual information such as name, address and telephone number to the two-way data communication apparatus 10 of the demanding terminal ID. In the two-way data communication apparatus 10, the birthday message including the received individual information is stored in the RAM 13 (step S1605), and the birthday message is displayed in the display 19 (step S1606). For one month from the birthday, every time the power source of the two-way data communication apparatus 10 is turned on, the birthday message is displayed. Waiting until expiring (step S1607), display of birthday message is stopped (step S1608), and the birthday message is erased from the RAM 13 (step S1609).

(Embodiment 11)

In the foregoing embodiments 9, 10, even after the user has confirmed the birthday message including the individual information, the message is displayed for a month from the birthday, and this annoyance is swept away herein.

Same as in FIG. 16, if not desired to display birthday message, the user manipulates the erase key on the operation input unit 20 (remote controller). As shown in FIG. 16(*a*), the CPU 11 judges if the erase key has been manipulated or not (step S1401), and when manipulated, the display flag $F_1$ is reset (step S1402). In the flowchart in FIG. 18, step S1703*a* is added, and the birthday message is displayed only when the display flag $F_1$ is set (step S1704), and when the display flag $F_1$ is reset, the birthday message is not displayed (step S1706). If the display flag $F_1$ remains reset, the birthday message is not displayed on the birthday of next year.

Accordingly, as shown in FIG. 16(*b*), it is judged if passing, for example, 11 months after birthday (step S1501), and if passing, the display flag $F_1$ is returned to the set state (step S1502). Then, judgement is YES at step S1703*a* in FIG. 18, so that the birthday message will be displayed again.

In other method, when the erase key is manipulated in the operation input unit 20, it may be considered to constitute so as not to transmit birthday message from the broadcast station 60. That is, when the erase key is manipulated, the individual information server 50 is dialed automatically from the two-way data communication apparatus 10, and the erase signal is sent together with the terminal ID. Receiving the erase signal, the individual information server 50 resets the display flag $F_1$ as the individual information of the corresponding terminal ID. The CPU of the individual information server 50 does not send the terminal ID to the broadcast station 60 if the present date reaches the birthday as far as the display flag $F_1$ is reset. Therefore, the terminal ID and birthday message are not sent out from the broadcast station 60. When passing, for example, more than 11 months from the birthday, the display flag $F_1$ is returned to the set state, so that the birthday message is sent out again on the next birthday.

In the foregoing embodiments 5 to 11, as the specific date to be compared with the present date, the birthday is represented, not limited to this, the user may register any desired date.

In the embodiments 5 to 11, the message to urge updating is displayed on the occasion of once a year. In the following embodiments, by contrast, the year is divided into four seasons, and the message to urge updating is displayed in every season to increase the number of occasions of urging to update.

The display flag may be also held in the individual information server.

(Embodiment 12)

As the turning points of seasons, four dates $T_1$, $T_2$, $T_3$, $T_4$ are set, and four corresponding season's greetings $M_1$, $M_2$, $M_3$, $M_4$ are set. For example, in this embodiment, $T_1$ is December 31, $T_2$ is March 31, $T_3$ is June 30, and $T_4$ is September 30. For example, season's greeting $M_1$ is "Happy New Year! Best wishes. Incidentally, if there is any change in your name, address or telephone number, please update your registration."; season's greeting $M_2$ is "It's getting warmer day by day. Do you enjoy the spring flowers? Incidentally, . . . (ditto) . . ."; season's greeting $M_3$ is "The summer is near. Have you planned your vacation? Incidentally, . . . (ditto) . . ."; and season's greeting $M_4$ is "The fall is a good season for reading books. But be careful not to catch cold. Incidentally, . . . (ditto) . . . ." The "ditto" is "if there is any change in your name, address or telephone number, please update your registration."

In the two-way data communication apparatus 10, the CPU 11 controls the season flag $F_2$ according to the built-in timer. That is, as shown in the flowchart in FIG. 6, judging if reaching the season's turning point $T_1$ (step S1801), and when reached, the season flag $F_2$ is reset (step S1802), judging if reaching the next season's turning point $T_2$ (step S1803), and when reached, the season flag $F_2$ is reset (step S1804), judging if reaching the next season's turning point $T_3$ (step S1805), and when reached, the season flag $F_2$ is reset (step S1806), and judging if reaching the next season's turning point $T_4$ (step S1807), and when reached, the season flag $F_2$ is reset (step S1808).

At the broadcast station 60, the season's turning point is judged, and the season's greeting corresponding to the present season is selected from the season's greetings $M_1$ to $M_4$, and it is sent on the broadcast wave routinely.

In the two-way data communication apparatus 10, when set in the mode of reception of data broadcast service, the operation in the flowchart in FIG. 20 is executed. Receiving the season's greeting from the broadcast station 60 (step S1901), it is judged if the season flag $F_2$ is reset (step S1902), and if reset, the received season's message is displayed in the display 19 (step S1903), and the season flag $F_2$ is set to show that the display is made (step S1904). As a result, the message composed of the season's greeting and urging for updating is displayed. Once the message is displayed, the season flag $F_2$ is set, and the judgement is NO at step S62, so that the message is no longer displayed.

It is specifically as follows. For example, on December 31 ($T_1$), the season flag $F_2$ is reset. Next day, January 1, when receiving data broadcast service, the season's greeting $M_1$ is received and displayed, "Happy New Year! Best wishes. Incidentally, if there is any change in your name, address or telephone number, please update your registration." On January 2, if data broadcast service is received, since the season flag $F_2$ is set, the season's greeting $M_1$ is not displayed. Next, on March 31 ($T_2$), the season flag $F_2$ is reset again, and when data broadcast service is received later, the season's greeting $M_2$ is displayed, and if the same service is received afterwards, the season's greeting $M_2$ is not displayed. The same hereinafter, the update urging message is displayed four times a year, and the number of occasions of urging to update is increased.

(Embodiment 13)

Embodiment 13 is intended to display the user individual information such as name, address, and telephone number registered in the individual information server 50. As shown in the flowchart in FIG. 21, receiving the season's greeting from the broadcast station 60 (step S2001), it is judged if the season flag $F_2$ is reset or not (step S2002), and when reset, the individual information server 50 is dialed automatically through the telephone circuit 30, and the terminal ID is sent and also transmission of user individual information is requested (step S2003). The individual information server 50 sends the registered user individual information according to the request from the two-way data communication apparatus 10 to the two-way data communication apparatus 10 of the demanding terminal ID. In the two-way data communication apparatus 10, the season's greeting received from the broadcast station 60 and the user individual information received from the individual information server 50 are displayed in the display 19 (step S2005), and the season flag $F_2$ is set to show the display is made (step S2006). Thus, the message composed of season's greeting, urging to update, and specific individual information such as name, address and telephone number is displayed. Once the message is displayed, the season flag $F_2$ is set, and it is judged NO at step S72, and message is not displayed.

(Embodiment 14)

Embodiment 14 is intended to judge the season flag $F_2$ in the response server, and send the season's greeting from the response server. This is explained by referring to FIG. 22 showing the operation at the side of two-way data communication apparatus 10 and flowchart in FIG. 23 showing the operation at the side of response server 40.

When utilizing online service from the two-way data communication apparatus 10 to the response server 40 through the telephone circuit 30, as shown in FIG. 22, access to the response server 40 is executed (step S2101), and the season flag $F_2$ and terminal ID are sent to the response server 40 at this time (step S2102). In the response server 40, as shown in FIG. 23, it is judged if the transmitted season flag $F_2$ is reset or not (step S2201), and if reset, accessing the individual information server 50, the user individual information (name, address, telephone number, etc.) is acquired (step S2202), and the message composed of season's greeting, urging to update, and specific individual information such as name, address and telephone number is set to the two-way data communication apparatus 10 of the received terminal ID through the telephone circuit 30 (step S2203), and thereafter the usual online service process is executed (step S2204). At the side of two-way data communication apparatus 10, receiving the message composed of season's greeting, urging to update, and specific individual information such as name, address and telephone number sent from the response server 40 is received (step S2103), and the message is displayed in the display 19 (step S2104), and the season flag $F_2$ is set to show the display is made (step S2105). Thereafter, the usual online service process is executed (step S2106).

Once the message is displayed at step S2103, the season flag $F_2$ is set, and until the season flag $F_2$ is reset again by the process in FIG. 19, if the online service is accessed, it is judged NO at step S2201 in FIG. 23 at the side of the response server 40, and hence process at steps S2202, S2203 is skipped to resume the ordinary online service process (step S2204).

(Embodiment 15)

In embodiment 15, transmission and display of user individual information in embodiment 14 are omitted. That is, the acquisition process of user individual information at step S2202 in FIG. 23 is omitted. At step S2203, the message composed of season's greeting and urging to update is sent to the two-way data communication apparatus 10. Similarly, what is received and displayed at steps S2103, S2104 in FIG. 22 is the message composed of season's greeting and urging to update.

In the foregoing embodiments 12 to 15, different season's greetings are prepared at every turning point of four seasons, but, instead, a common greeting may be always given. For example, "How are you?" It is only an example to divide the year into four, but it may be divided into two, six or twelve. The more the number of divisions, the more occasions are available for urging to update registration. In FIG. 19, the season's turning point dates of $T_1$, $T_2$, $T_3$, $T_4$ may be common fixed values in the two-way data communication apparatus 10, but it may cause concentration of updating procedures of registration of user individual information, possibly leading to disorderly connection tries or jamming of circuit. Accordingly, in the manufacturing stage (before shipping) of the two-way data communication apparatus 10, when registering the terminal ID or the like, the season's turning point date may be slightly deviated in every model or lot. Hence, the timing of updating procedure may be dispersed, and the processing may be done smoothly on the whole.

According to the invention, as clear from the illustrated embodiments, the user information is protected, updated, and registered securely, and troubles occurring in two-way communication can be prevented, and in particular by establishing an organ of individual information server for storing and controlling the individual information exclusively, in addition to the effect of elimination of necessity of registering individual information in each response server, the individual information can be registered, updated and collated more easily, and protected more securely by installing the means for controlling the user information for registering, updating and collating the individual information of individual information servers in the two-way data communication apparatus itself.

Thus, according to the invention, the confidence of control of individual information can be enhanced in two-way data communication, and when ordering a commodity, since the user individual information is once displayed to the user, the user can confirm that the user individual information is correct, and if changed correctly or not when ordered, so that the accuracy of user individual information can be assured, and this effect is an indispensable benefit for the user.

Also according to the invention, the individual information can be controlled for a long period, and this effect is indispensable for the two-way media.

Further according to the invention, if the user individual information such as name, address, and telephone number is changed, an urging message to update the registration is displayed, and the registration is renewed, so that the two-way data system can function organically.

We claim:

1. A two-way data communication method comprising the steps of:
    decoding at least one of a television broadcast signal and a data broadcast signal into decoded information, said television broadcast signal and said data broadcast signal transmitted through a first communication medium,
    displaying the decoded information on a display device,
    providing user information to an individual information server through a second communication medium,
    providing response information to a response server through a third communication medium,
    providing further response information between the response server and the individual information server through a fourth communication medium, and
    controlling at least one of i) a flow of the user information through the second communication medium to and from the individual information server, ii) a flow of the response information through the third communication medium to and from the response server, and iii) a use of the user information in the individual information server.

2. A two-way data communication method of claim 1, wherein the controlling step at least one of i) requests, ii) updates, iii) confirms, and iv) compares the user information in the individual information server through a response server.

3. A two-way data communication method of claim 1, wherein the controlling step further comprises the steps of:
    sending ciphered first information from the user to the response server through the communication medium,
    receiving a ciphered confirm response from the individual information server through the response server,
    receiving key information for deciphering the confirm response,
    confirming transmission of the first information by the key information,
    sending ciphered second information to the individual information server through the response server to confirm the first information, and
    sending the user information to the response server by the individual information server according to the second information, and supplying the user information to a third party by the response server.

4. A two-way data communication method of claim 1, wherein the controlling step further comprises the steps of:
    reestablishing connection of the communication medium on the basis of the user information from the individual information server in a specific period after the communication medium is initially terminated, and
    displaying one of i) completion of a procedure when the user information compares and ii) an incomplete procedure when the user information does not compare.

5. A two-way data communication method of claim 1, wherein the controlling step further comprises the steps of:
    comparing data of a date of the registered user information and a present date, and
    displaying at least one of a specific subsequent period when the date of the registered user and the present date match, and a message for urging updating if necessary to change the user individual information.

6. A two-way data communication apparatus comprising:
    data broadcast decoder means for decoding at least one of a television broadcast signal and a data broadcast signal transmitted through a first communication medium,
    display means for displaying information of at least one of said television broadcast and said data broadcast decoded by the data broadcast decoder means,
    a modem connected to a second communication medium,
    user information control means for controlling i) the user information to be recorded in an individual information server and ii) response information sent to a response server, and
    a third communications medium connected between the individual information server and the response server,
    wherein the user information control means i) provides the user information to the individual information server through the second communication medium, ii) provides the response information to the response server through the third communication medium, and iii) controls the use of the user information in the individual information server.

7. A two-way data communication apparatus of claim 6, wherein the user information control means at least one of i) registers, ii) updates, iii) confirms, and iv) compares the user information in the individual information server through a response server.

8. A two-way data communication apparatus of claim 6, wherein the user information control means further comprises:
    means for sending ciphered first information to a response server by the user through a further communication medium,
    means for receiving a ciphered confirm response from an individual information server through the response server, means for receiving key information for deciphering the ciphered confirm response, means for confirming transmission of the first information by the key information, and means for sending ciphered second information to the individual information server through the response server to confirm the first information, wherein the individual information server sends the user information to the response server on the basis of the second information, and the user information is supplied to a third party by the response server.

9. A two-way data communication apparatus of claim 6, wherein the user information control means further comprises:

means for reestablishing connection of the communication medium on the basis of the user information from the individual information server in a specific time after the telephone circuit is initially terminated, wherein the completion of a procedure is displayed when the user information compares and an incomplete procedure is displayed when the user information does not compare.

10. A two-way data communication apparatus of claim 6, wherein the user information control means further comprises:

means for comparing the date of the registered user information and a present date, and means for displaying a message for urging to update the registration if the user individual information is changed for at least one of i) when the date of the registered user matches the present date and ii) for a specific period after the date of the registered user matches the present date.

11. A two-way data communication method comprising the steps of, sending a ciphered first information to a response server through a first communication medium, providing the ciphered first information from the response server to an individual information server through a second communications medium, so that a ciphered confirm reply is sent from the individual information server to the user through the response server, sending key information for decoding the ciphered confirm reply from the individual information server to the user, and the user confirms transmission of the first information, through a third communications medium, sending ciphered second information to compensate for the first information from the user to the individual information server through the response server, and sending user information from the individual information server to the response server on the basis of the second information, wherein the response server supplies the user information to a third party.

12. A two-way communication method of claim 11, wherein the key information for decoding the ciphered confirm reply supplied from the individual information server is changed and transmitted periodically.

13. A two-way data communication method of claim 11, wherein the key information for decoding the ciphered confirm reply supplied from the individual information server is transmitted one of before and after transmission of the confirm reply.

14. A two-way data communication apparatus comprising:

means for sending ciphered first information to a response server through a communication medium by a user, an individual information server for sending the ciphered first information from the response server and issuing a ciphered confirm reply, means for receiving the ciphered confirm reply through the response server, and confirming transmission of the first information by receiving key information for decoding, and means for sending ciphered second information to verify the first information to the individual information server through the response server, wherein the individual information server sends user information to the response server on the basis of the second information, and the response server supplies the user information to a third party.

15. A two-way data communication apparatus of claim 14, wherein the key information for decoding the ciphered confirm reply supplied by the individual information server is periodically changed and transmitted.

16. A two-way data communication apparatus of claim 15, wherein the key information for decoding the ciphered confirm reply supplied by the individual information server is transmitted one of before and after the transmission of the ciphered confirm reply.

17. A two-way data communication method comprising the steps of:

decoding one of a television broadcast signal and a data broadcast signal transmitted through a first communication medium, displaying decoded information of at least one of the television broadcast signal and the data broadcast signal, presenting user information to an individual information server through a second communication medium by a user, reestablishing connection of the second communication medium on the basis of the user information from the individual information server in a specified period after the second communicating medium is initially transmitted, and displaying one of i) completion of a procedure when the user information compares and ii) an incomplete procedure when the user information does not compare.

18. A two-way data communication apparatus comprising:

data broadcast decoder means for decoding one of a television broadcast signal and a data broadcast signal transmitted through a first communication medium, display means for displaying the information of at least one of the television broadcast signal and the data broadcast signal, and a modem connected to a second communication medium, wherein a user presents user information to an individual information server through the second communication medium, for reestablishing connection of the second communication medium on the basis of the user information from the individual information server in a specific period after the second communication medium is initially terminated, the user presents response information to a response server through a third communication medium, and displaying one of i) completion of a procedure when the user information compares and ii) an incomplete procedure when the user information does not compare.

19. A two-way data communication method comprising the steps of:

decoding at least one of a television broadcast signal and a data broadcast signal transmitted through a first communication medium, displaying decoded information of at least one of the television broadcast signal and the data broadcast signal, presenting user information to an individual information server through a second communication medium, presenting response information to a response server through a third communication medium, and displaying an information hierarchically from the individual information server.

20. A two-way data communication apparatus comprising:

data broadcast decoder means for decoding at least one of a television broadcast signal and a data broadcast signal transmitted through a first communication medium, display means for displaying decoded information of said television broadcast signal and said data broadcast signal, and a modem connected to a second communication medium, wherein information is presented hierarchically from the individual information server to a display when presenting user information to the individual information server through the second communication medium.

21. A two-way data communication apparatus of claim 20, wherein the hierarchical information is presented from the individual information server.

22. A two-way data communication apparatus of claim 20, further comprising memory means for storing the hierarchical information.

23. A two-way data communication method comprising the steps of:

decoding at least one of a television broadcast signal and a data broadcast signal transmitted through a first communication medium, displaying the decoded information of at least one of the television broadcast signal and data broadcast signal, presenting user information to an individual information server through a second communication medium, reestablishing connection of the second communication medium on the basis of the user information from the individual information server in a specific period after the second communication medium is initially terminated, and repeating the re-establishment of the connection of the user and individual information server in every specific period.

24. A two-way data communication method of claim 23, wherein the reestablishing step is started after requesting connection from the individual information server.

25. A two-way data communication method of claim 23, wherein the reestablishing step is started after the step of requesting connection from the user.

26. A two-way data communication apparatus comprising:

data broadcast decoder means for decoding at least one of a television broadcast signal and a data broadcast signal transmitted through a first communication medium, display means for displaying the information of at least one of the television broadcast signal and the data broadcast signal, and a modem coupled to second communication medium, wherein establishment of a connection of a user and an individual information server is repeated in a specific period.

27. A two-way data communication apparatus of claim 26, wherein establishment of the connection of the user and the individual information server is started after a request for connection from the individual information server.

28. A two-way data communication apparatus of claim 26, wherein establishment of the connection of the user and the individual information server is started after a request for connection from the user.

29. A two-way data communication method comprising the steps of:

decoding at least one of a television broadcast signal and a data broadcast signal transmitted through a first communication medium, displaying decoded information of at least one of the television broadcast signal and the data broadcast signal, registering user individual information in an individual information server through a second communications medium, registering a specific date about the registered user individual information, comparing data of the specific date with a present date, and displaying a message for urging to update the registration if the user individual information is changed for at least one of i) when the date of the registered user matches the present date and ii) for a specific period after the date of the registered user matches the present date.

30. A two-way data communication method of claim 29, further comprising the steps of:

displaying the message for urging to update the registration when a display flag is set, and erasing the message for urging to update the registration after the message is displayed, wherein the display flag is contained in the individual information server.

31. A two-way data communication method of claim 29, further comprising the steps of:

comparing the specific date registered in an individual server with the present date in the individual information server, sending a terminal ID corresponding to coincidence of dates to a broadcast station, sending a terminal ID together with the message for urging to update the registration from the broadcast station, and comparing the received terminal ID and registered terminal ID, and displaying the message for urging to update the registration when the received terminal ID and the registered terminal ID match.

32. A two-way data communication method of claim 31, wherein the message for urging to update the registration including the user individual information is provided from the individual information server by accessing the individual information server from the apparatus through the communication medium when the terminal IDs match.

33. A two-way data communication method of claim 31, further comprising the steps of:

displaying of the message for urging to update the registration when a display flag is set, and resetting the display flag to prohibit one of message display and message transmission by erasing the message for urging to update the registration after the message is displayed.

34. A two-way data communication method of claim 29, wherein a birthday of the user is used as the specific date.

35. A two-way data communication apparatus comprising:

data broadcast decoder means for decoding at least one of a television broadcast signal and a data broadcast signal transmitted through a first communication medium, display means for displaying the information of at least one of the television broadcast signal and the data broadcast signal, and a modem connected to a second communication medium, wherein the two-way data communication apparatus displays a message for urging to update a registration if necessary to change the user individual information for a specific period after confirming coincidence by comparing the registered data of a specific date and a present date contained in an individual information server.

36. A two-way data communication apparatus of claim 35, wherein the specific date is registered in a memory means of the apparatus.

37. A two-way data communication apparatus of claim 35, wherein the message for urging to update the registration is periodically sent from the broadcast station.

38. A two-way data communication apparatus of claim 35, wherein the message for urging to update registration is provided from the response server by accessing the response server through the communication medium from the apparatus when the specific date and the present date match and for a specific period thereafter.

39. A two-way data communication apparatus of claim 35, wherein the message for urging to update registration is provided from the individual information server by accessing the individual information server through the communication medium from the apparatus when the specific date and the present date match and for a specific period thereafter.

40. A two-way data communication apparatus of claim 35, wherein the message for urging to update the registration is registered in memory means of the apparatus.

41. A two-way data communication apparatus of claim 35, wherein the apparatus i) permits display of the message for urging to update the registration when the display flag is set, and ii) prevents display of the message by resetting the display flag in the apparatus after the message for urging to update the registration is displayed.

42. A two-way data communication apparatus of claim 41, wherein the apparatus i) permits display of the message for urging to update the registration when the display flag is set, and ii) prevents display of the message by holding the display flag in the individual information server after the message for urging to update the registration is displayed.

43. A two-way data communication apparatus of claim 35, wherein the specific date is registered in the individual information server, the registered specific date and the present date are compared in the individual information server, when the terminal ID corresponding to coincidence of the registered specific date and the present date is sent out to the broadcast station, the terminal ID is sent from the broadcast station together with the message for urging to update the registration to the apparatus, the terminal ID received in the apparatus and the registered terminal ID are compared, and a message for urging to update the registration is displayed when matched.

44. A two-way data communication apparatus of claim 43, wherein a message for urging to update the registration including the user individual information is provided from the individual information server by accessing the individual information server through the communication medium from the apparatus when the terminal IDs match.

45. A two-way data communication apparatus of claim 43, wherein the apparatus permits display of the message for urging to update the registration when a display flag is set, and prevents one of i) message display and ii) message transmission by resetting the display flag after the message for urging to update the registration is displayed.

46. A two-way data communication apparatus of claim 35, wherein a birthday of the user is used as the specific date.

47. A two-way data communication method comprising the steps of:

decoding at least one of a television broadcast signal and data broadcast signal transmitted through a first communication medium, displaying decoded information of at least one of the television broadcast signal and the data broadcast signal, registering user individual information in an individual information server through a second communications medium, and displaying a message for urging to update the registration if necessary to change the user individual information when reaching a date at a predetermined point of a period as one year is divided into a plurality of periods.

48. A two-way communication method of claim 47, wherein the message for urging to update the registration in each of said plurality of periods is a message composed of season's greeting and urging to update the registration, and the season's greeting is a different message in each one of the plurality of periods.

49. A two-way communication method of claim 47, further comprising:

providing a flag which is reset when reaching the date of the predetermined point of each of the plurality of periods, displaying a message for urging to update the registration in each of the plurality of periods received when the flag is in a reset state, and setting the flag after the display.

50. A two-way data communication method of claim 47, wherein the message for urging to update the registration in each of the plurality of periods is a message composed of i) season's greeting, ii) urging to update, and iii) user individual information.

51. A two-way data communication method of claim 47, further comprising:

providing a flag which is reset when reaching the date of the predetermined point of each of the plurality of periods, sending the state of the flag to the response server through the communication medium, sending a message urging to update the registration in each of the plurality of periods when the flag is in a reset state in the response server, and displaying the message for urging to update the registration in the received period, and setting the flag after the display.

52. A two-way data communication method of claim 51, further comprising:

sending user individual information together with a message for urging to update the registration in each of the plurality of periods, and receiving and displaying the message for urging to update the registration and the user information.

53. A two-way data communication method of claim 47, wherein the date at the predetermined point of each period of one year divided into the plurality of periods is designed to be set variously.

54. A two-way data communication apparatus comprising:
- data broadcast decoder means for decoding at least one of a television broadcast signal and a data broadcast signal transmitted through a first communication medium,
- display means for displaying the information of at least one of the television broadcast signal and the data broadcast signal, and
- a modem connected to a second communication medium,
- wherein a message for urging to update a registration if necessary to change the user individual information is displayed when reaching the date of a predetermined point of each period of a year divided into a plurality of periods, in a system for registering the user individual information of the apparatus in an individual information server.

55. A two-way data communication apparatus of claim 54, wherein the message for urging to update the registration in each of the plurality of periods is a message composed of season's greeting and urging to update the registration, and the season's greeting is a different message in each one of the plurality of periods.

56. A two-way data communication apparatus of claim 54, wherein a flag is reset when reaching the date of the predetermined point of each period, and a message for urging to update the registration in each of the plurality of periods received is displayed when the flag is in reset state, an then the flag is set after the display.

57. A two-way data communication apparatus of claim 54, wherein the message for urging to update the registration in each of the plurality of periods is a message composed of i) season's greeting, ii) urging to update, and iii) user individual information.

58. A two-way data communication apparatus of claim 54, wherein a flag is reset when reaching the date of the predetermined point of each period, the state of the flag to the response server is sent through the telephone circuit, a message urging to update the registration in each of the plurality of periods is displayed when the flag is in reset state in the response server, and the message for urging to update the registration in the received period is displayed, then the flag is set after the display.

59. A two-way data communication apparatus of claim 54, wherein user individual information is sent together with a message for urging to update the registration in each of the plurality of periods, and the message for urging to update the registration is received and displayed together with the user information.

60. A two-way data communication apparatus of claim 54, wherein the date at turning point of each period of one year divided into the plurality of periods is designed to be set variously.

61. A two-way data communication apparatus for use with a communications medium comprising:
- data broadcast decoder means for decoding at least one of a television broadcast signal and a data broadcast signal transmitted through said communication medium,
- display means for displaying the information of said at least one of said television broadcast and said data broadcast decoded by said data broadcast decoder means,
- interface means for interfacing i) said communication medium, ii) an individual information server, and iii) a two-way communication apparatus, and
- access control means for controlling at least one of access between and communication with i) an individual information server, ii) the interface means, and iii) said two-way data communication apparatus.

62. A two-way data communication method comprising the steps of:
- decoding at least one of a television broadcast signal and data broadcast signal transmitted through a communication medium,
- displaying decoded information of said at least one of said television broadcast and said data broadcast,
- interfacing i) said communication medium, ii) an individual information server, and iii) a two-way communication apparatus, and
- controlling at least one of access between and communication with i) said individual information server, ii) the interface means, and iii) said two-way data communication apparatus.

63. A two-way data communication method of claim 1, wherein user information is at least one of i) a name, ii) an address, iii) a telephone number, iv) a service outlet code, v) a terminal ID, vi) a user ID, and vii) a password.

* * * * *